Sept. 9, 1941.  W. W. LANDSIEDEL  2,255,623
COMPUTING MACHINE
Original Filed Feb. 3, 1934   13 Sheets-Sheet 1

INVENTOR
W. W. LANDSIEDEL
BY W. A. Sparks
ATTORNEY

Sept. 9, 1941.  W. W. LANDSIEDEL  2,255,623
COMPUTING MACHINE
Original Filed Feb. 3, 1934   13 Sheets-Sheet 2

INVENTOR
W. W. LANDSIEDEL
BY H. A. Sparks
ATTORNEY

Sept. 9, 1941.  W. W. LANDSIEDEL  2,255,623
COMPUTING MACHINE
Original Filed Feb. 3, 1934    13 Sheets-Sheet 4

INVENTOR
W. W. LANDSIEDEL
BY *H. A. Sparks*
ATTORNEY

Sept. 9, 1941.   W. W. LANDSIEDEL   2,255,623
COMPUTING MACHINE
Original Filed Feb. 3, 1934   13 Sheets-Sheet 5

INVENTOR
W. W. LANDSIEDEL
BY W. A. Spark
ATTORNEY

Sept. 9, 1941.     W. W. LANDSIEDEL     2,255,623
COMPUTING MACHINE
Original Filed Feb. 3, 1934     13 Sheets-Sheet 6
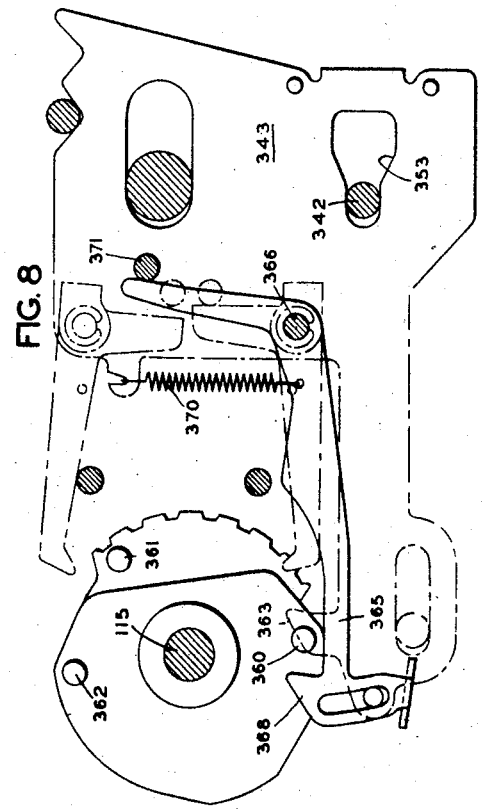
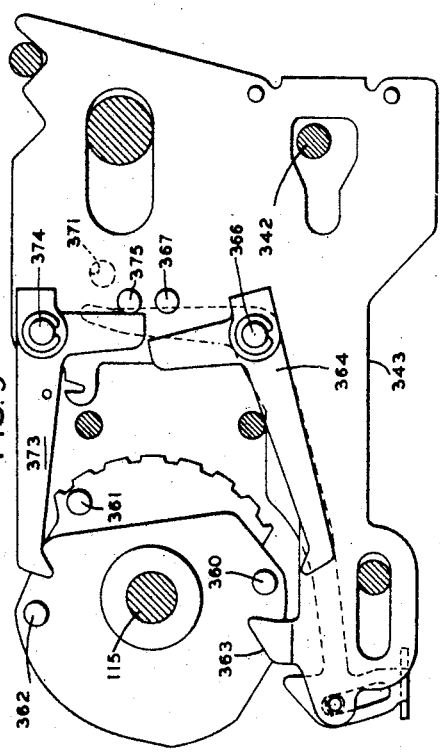
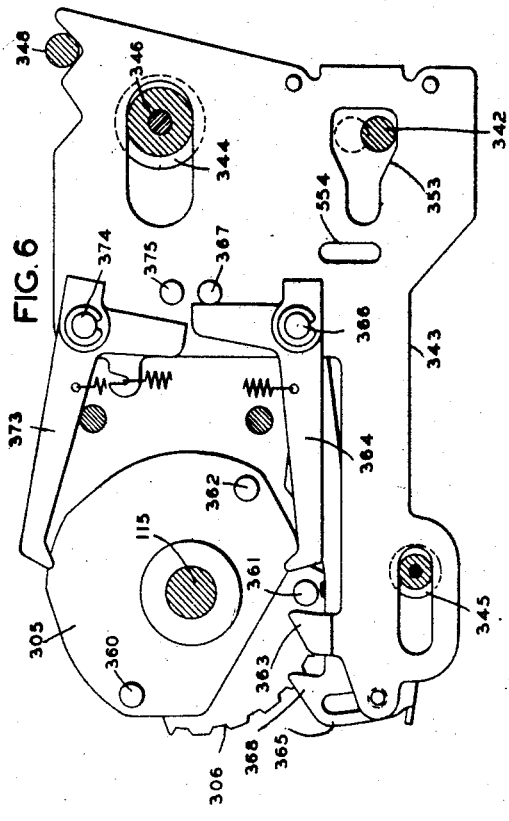
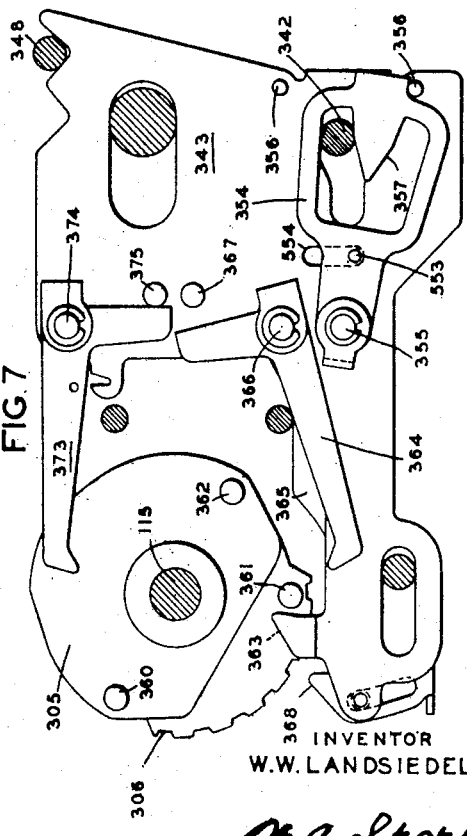
INVENTOR
W.W. LANDSIEDEL
BY W. A. Spark
ATTORNEY Sept. 9, 1941. W. W. LANDSIEDEL 2,255,623
COMPUTING MACHINE
Original Filed Feb. 3, 1934 13 Sheets-Sheet 7

INVENTOR
W. W. LANDSIEDEL
BY W. A. Sparks
ATTORNEY

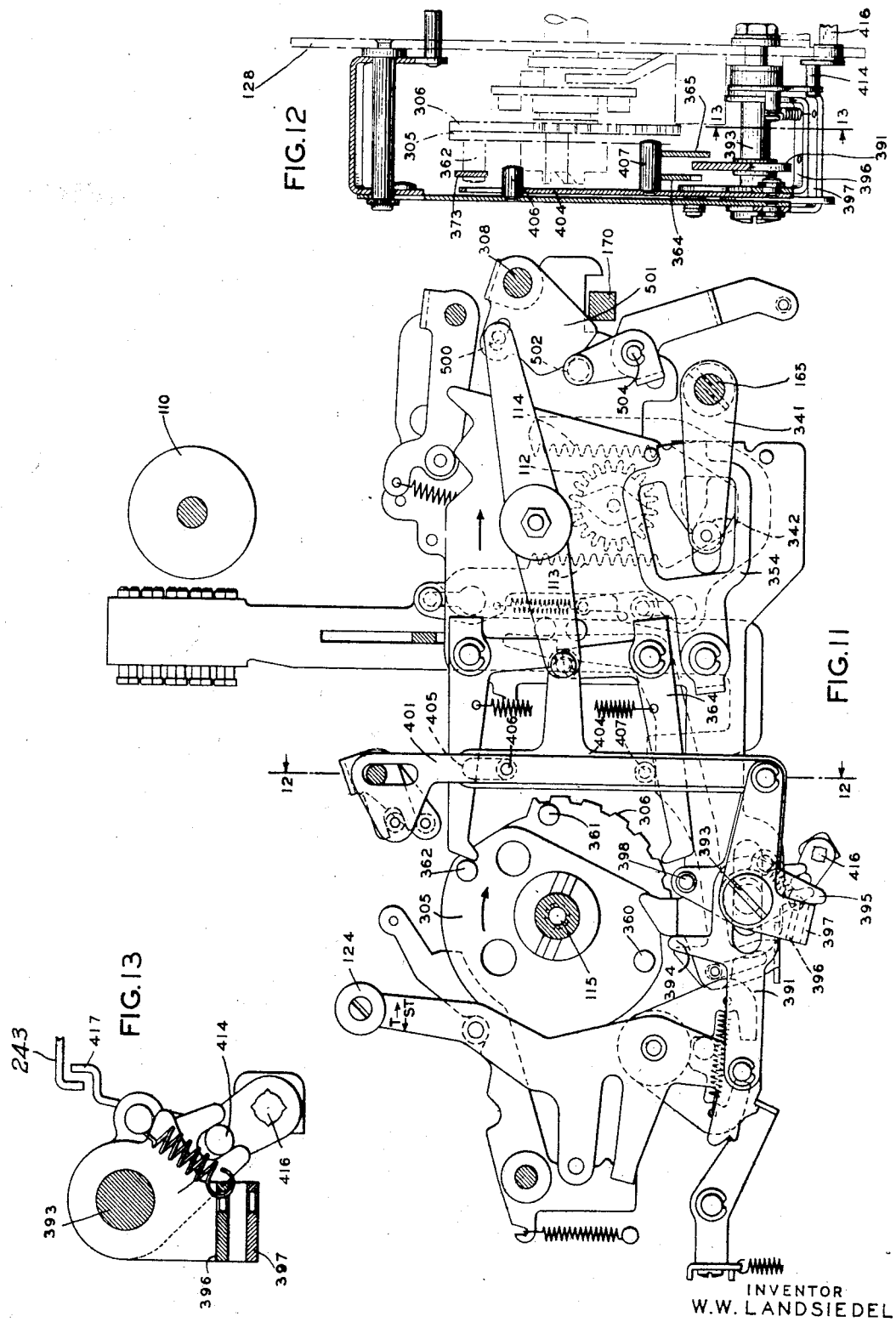

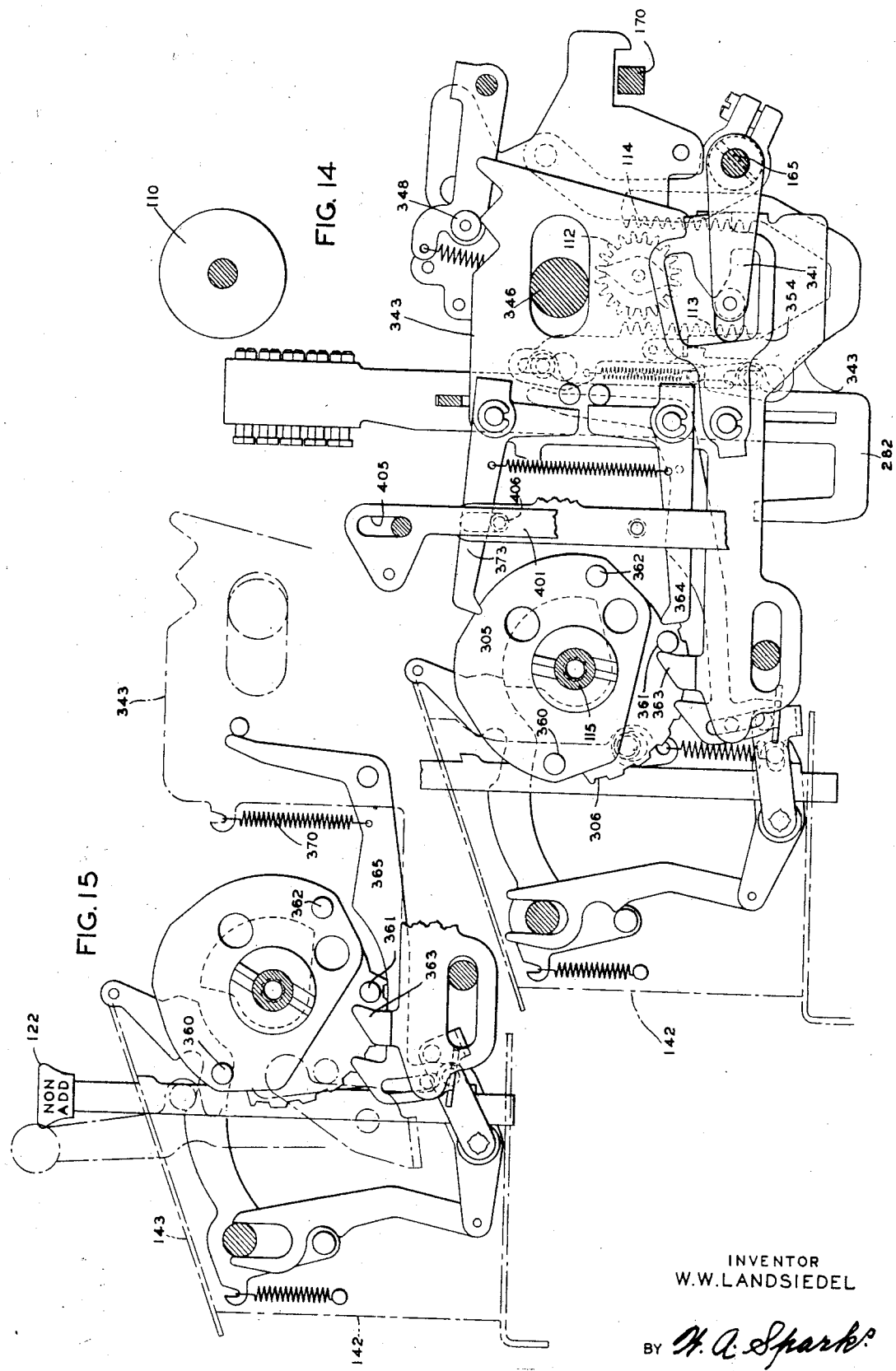

Sept. 9, 1941. W. W. LANDSIEDEL 2,255,623
COMPUTING MACHINE
Original Filed Feb. 3, 1934  13 Sheets-Sheet 10
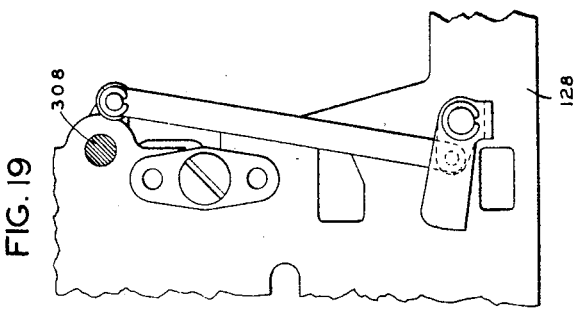
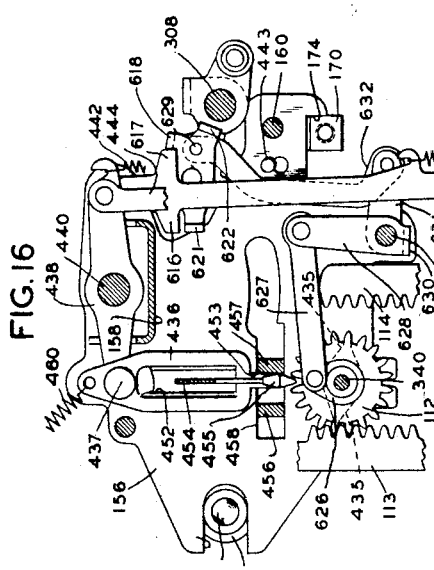
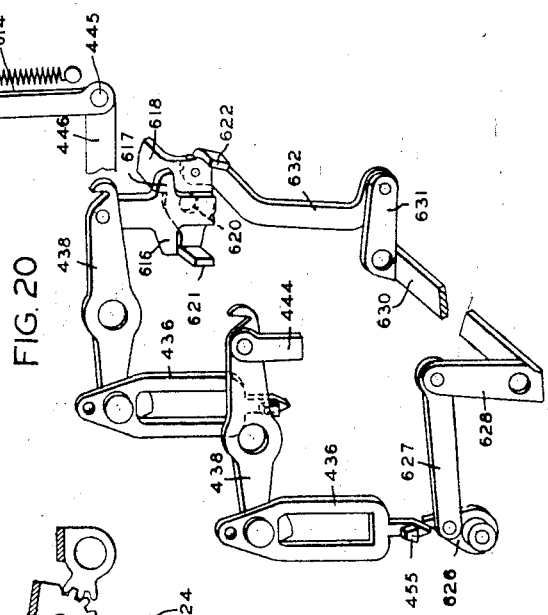
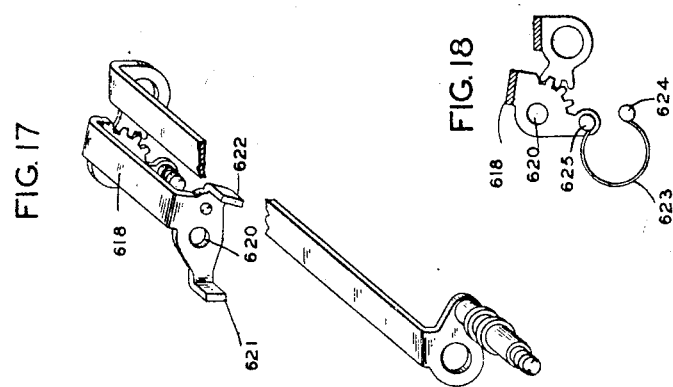
INVENTOR
W.W. LANDSIEDEL
BY W. A. Sparks
ATTORNEY Sept. 9, 1941. W. W. LANDSIEDEL 2,255,623
COMPUTING MACHINE
Original Filed Feb. 3, 1934   13 Sheets-Sheet 11
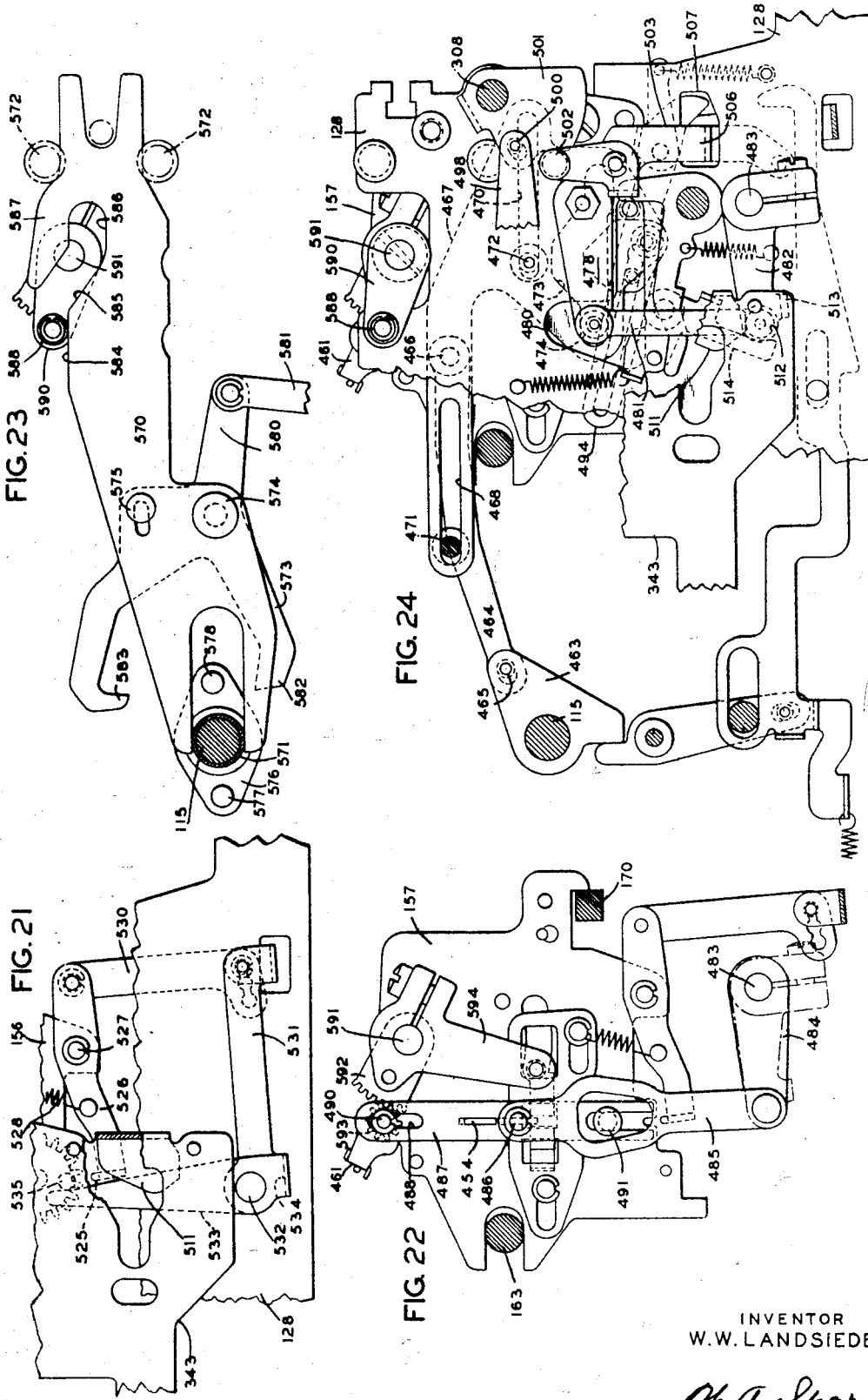
INVENTOR
W. W. LANDSIEDEL
BY W. A. Sparks
ATTORNEY Sept. 9, 1941.   W. W. LANDSIEDEL   2,255,623
COMPUTING MACHINE
Original Filed Feb. 3, 1934   13 Sheets-Sheet 12
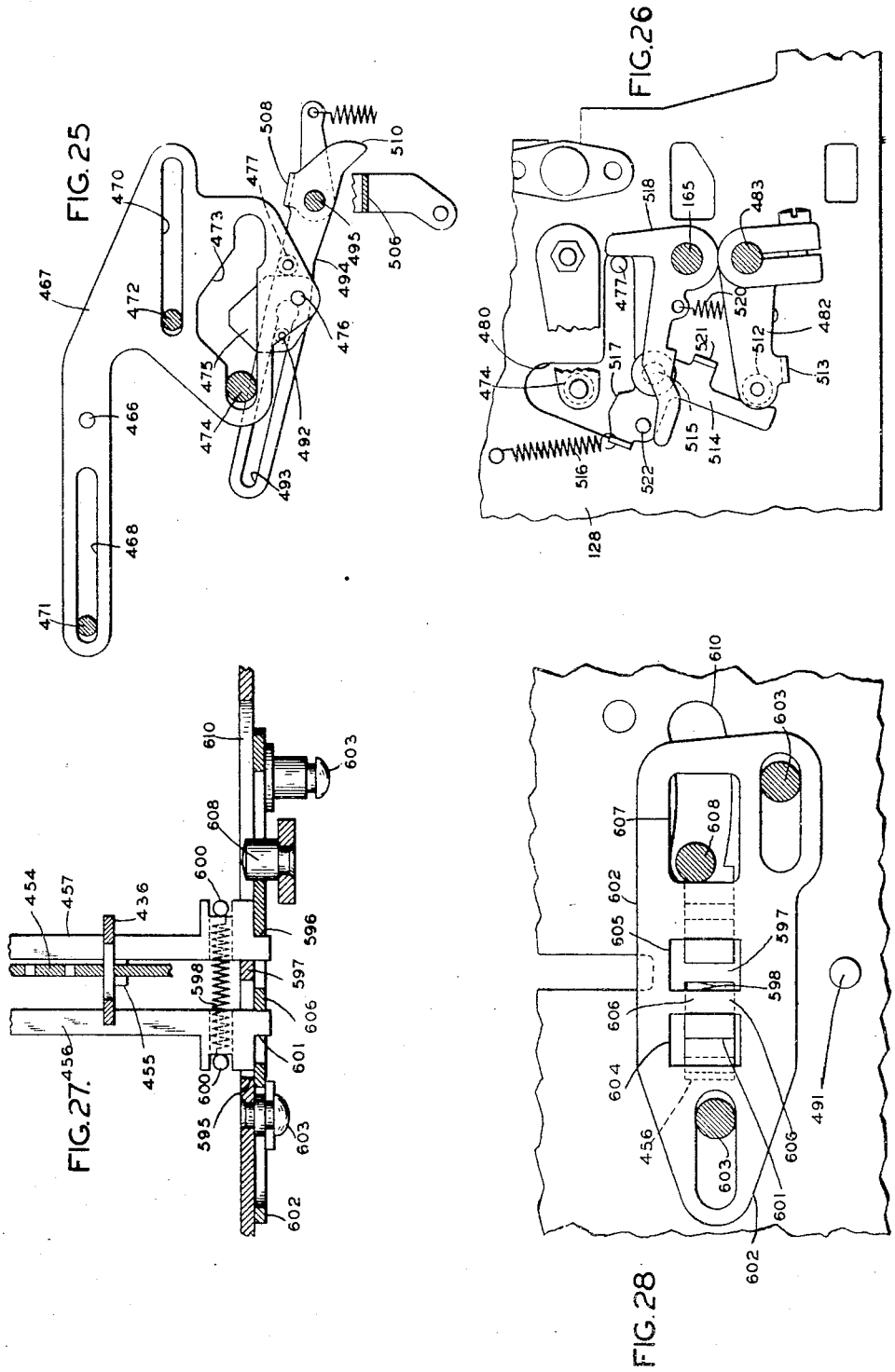
INVENTOR
W. W. LANDSIEDEL
BY W. A. Spark
ATTORNEY Patented Sept. 9, 1941

2,255,623

UNITED STATES PATENT OFFICE 2,255,623

COMPUTING MACHINE

Walter W. Landsiedel, Elmira, N. Y., assignor to Remington Rand Inc., Buffalo, N. Y., a corporation of Delaware Original application February 3, 1934, Serial No. 709,604. Divided and this application December 11, 1937, Serial No. 179,265

17 Claims. (Cl. 235—60)

The present invention relates to computing machines, and it resides in certain improvements, features of construction and combinations and arrangements of parts, all of which will be fully set forth herein and particularly pointed out in the claims.

This application is a division of my prior application for Letters Patent for Computing and listing machine, filed Feb. 3, 1934, Serial No. 709,604, now Patent No. 2,203,533, issued June 4, 1940. Said prior patent discloses a complete computing and listing machine embodying the present invention among others, which others are claimed in the said prior application or in other divisions thereof which may be filed, and some of which others are more or less completely disclosed in the present application. The present invention relates more especially to the registering and transfer mechanism of said machine. Said mechanism, or portions or features thereof, may be embodied in other machines differing widely from that of the parent application.

The present application discloses in detail one specific instance of the invention, which, however, may be modified in detail and arrangement without departing from the invention.

The invention has for its object to provide certain improvements in registering mechanism and especially in the transfer mechanism, which improvements will be understood from the following description. The register is of the type in which the register wheels are situated between two series of parallel racks and may be moved into engagement with one of said racks for addition and with the other for subtraction. The transfer is effected by allowing to said racks on occasion a unit's extra movement. The means for controlling this movement include certain dogs which can be displaced in opposite directions from a middle locked position. The mechanism includes improved means for registering the "fugitive one," for automatically controlling the engagement of the register wheels with one or the other series of racks depending on the sign of the total, and other features to be described herein.

To the above and other ends, which will be apparent upon a reading of this specification, the invention resides in certain features of construction and combinations and arrangement of parts, all of which will be described herein and recited in the claims.

Figure 10:
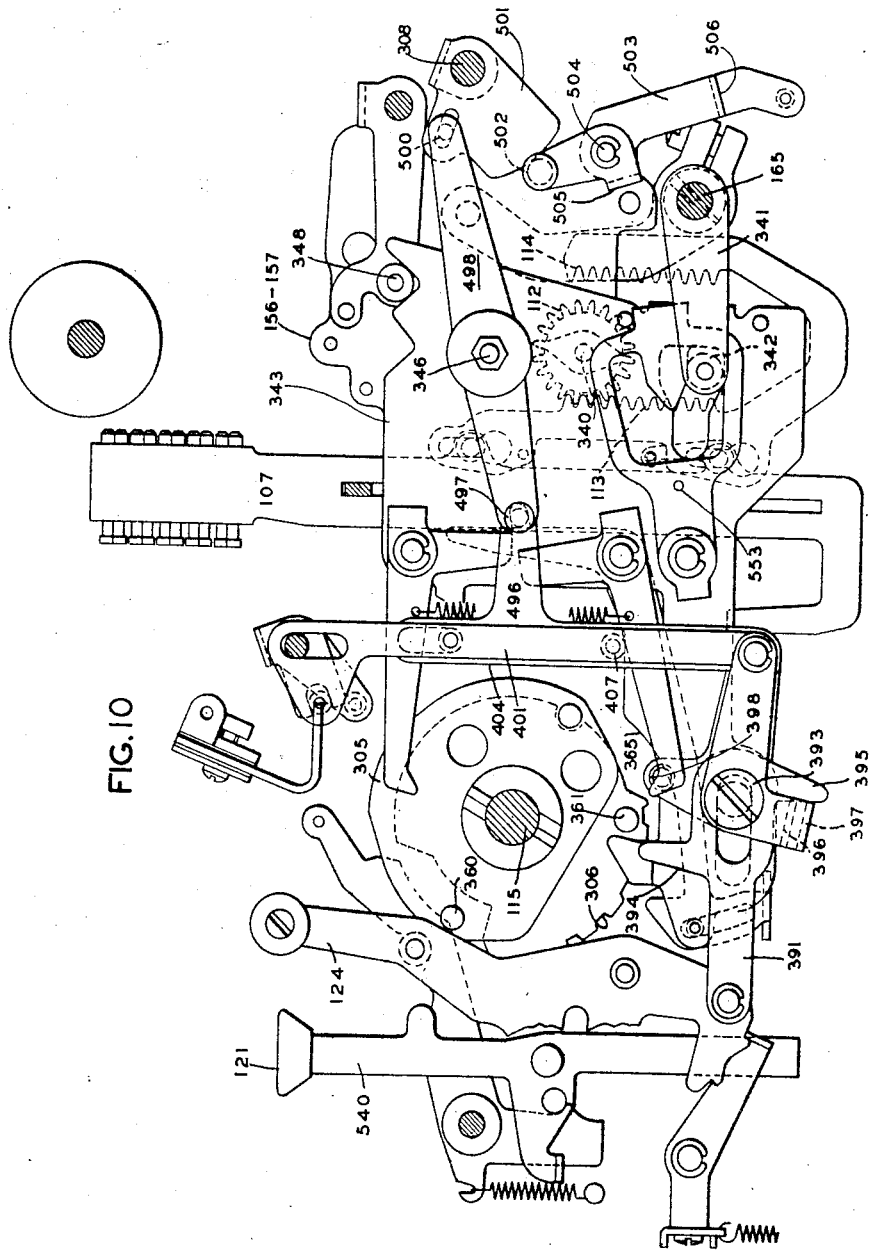
Figure 29:
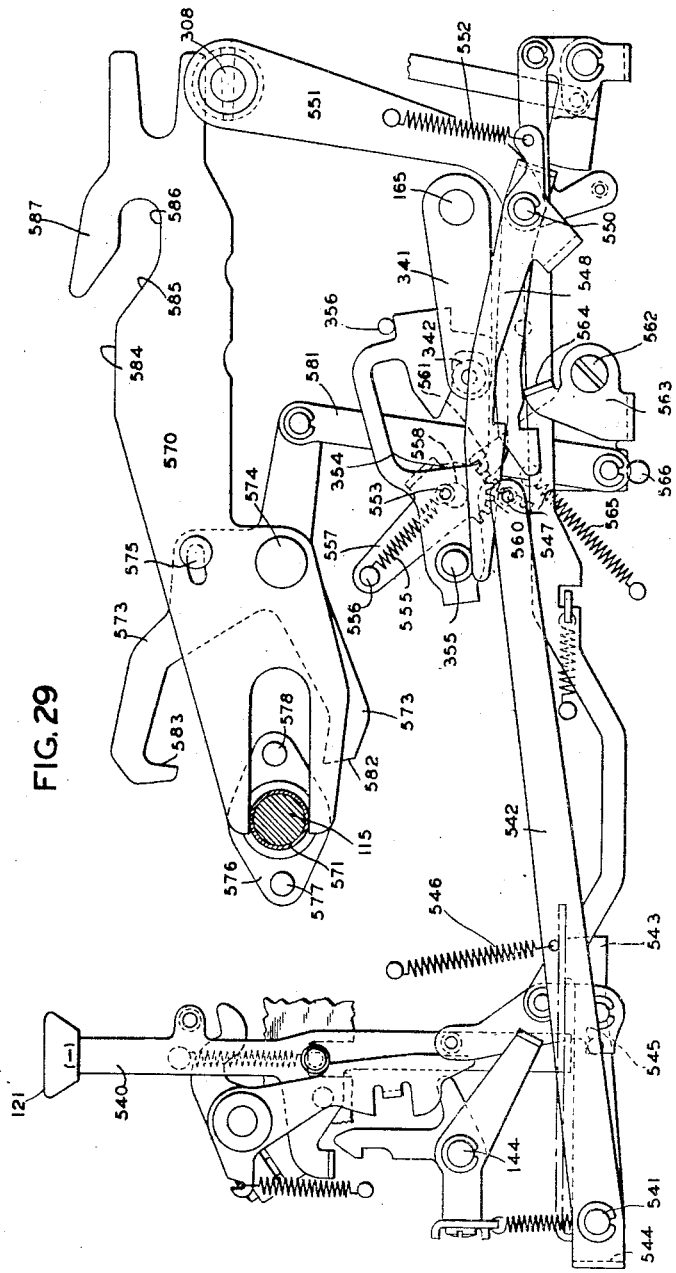

Figs. 6–9 are detached diagrammatic views of mechanism concerned in shifting the register into and out of mesh with its actuating racks. In Fig. 6 the parts are in normal position; in Fig. 7 the parts are in position for taking a total with clearing but before the operation mechanism has started; in Fig. 8 the parts are shown at the end of the forward stroke of a computing operation; and in Fig. 9 they are shown at the end of the forward stroke in taking a total (with clearing);

Fig. 10 is a right-hand side elevation of some of the mechanism with the total key set for taking a total but the mechanism otherwise normal;

Fig. 11 shows the same setting as Fig. 10 but with the parts as they stand in the course of the return stroke of the operating mechanism;

Fig. 12 is a vertical section on the line 12—12 of Fig. 11 and looking toward the front of the machine as indicated by the arrows;

Fig. 13 is an enlarged section on the line 13—13 of Fig. 12 and looking in the direction of the arrows at said line;

Figs. 14 and 15 are right-hand side elevations illustrating the non-add key and its associated parts, said key being in normal position in Fig. 15 and depressed in Fig. 14;

Fig. 16 is a partial right-hand side view of the register and transfer mechanisms with parts omitted or shown in section or broken away;

Figs. 17, 18, and 19 are views of the algebraic or "credit balance" mechanism, Fig. 17 being in isometric view, and Figs. 18 and 19 detail views;

Fig. 20 is an isometric view of the means for inserting the fugitive one;

Fig. 21 is a fragmentary right-hand side elevation showing the register wheel aligning device and associated parts;

Fig. 22 is a view from the right and showing some of the parts for controlling the register and its transfer mechanism;

Fig. 23 is a detail view of a portion of the subtraction mechanism;

Fig. 24 is a fragmentary right-hand elevation showing some of the mechanism for resetting the transfer mechanism and other parts;

Figs. 25 and 26 are detached views of portions of the transfer resetting mechanism;

Figs. 27 and 28 are enlarged views of portions of the register concerned with the transfer mechanism, the former being a plan view in section and the latter an elevation as seen from the right; and Fig. 29 is a detached view of the subtraction key and some of the mechanism controlled thereby.

Figure 1:
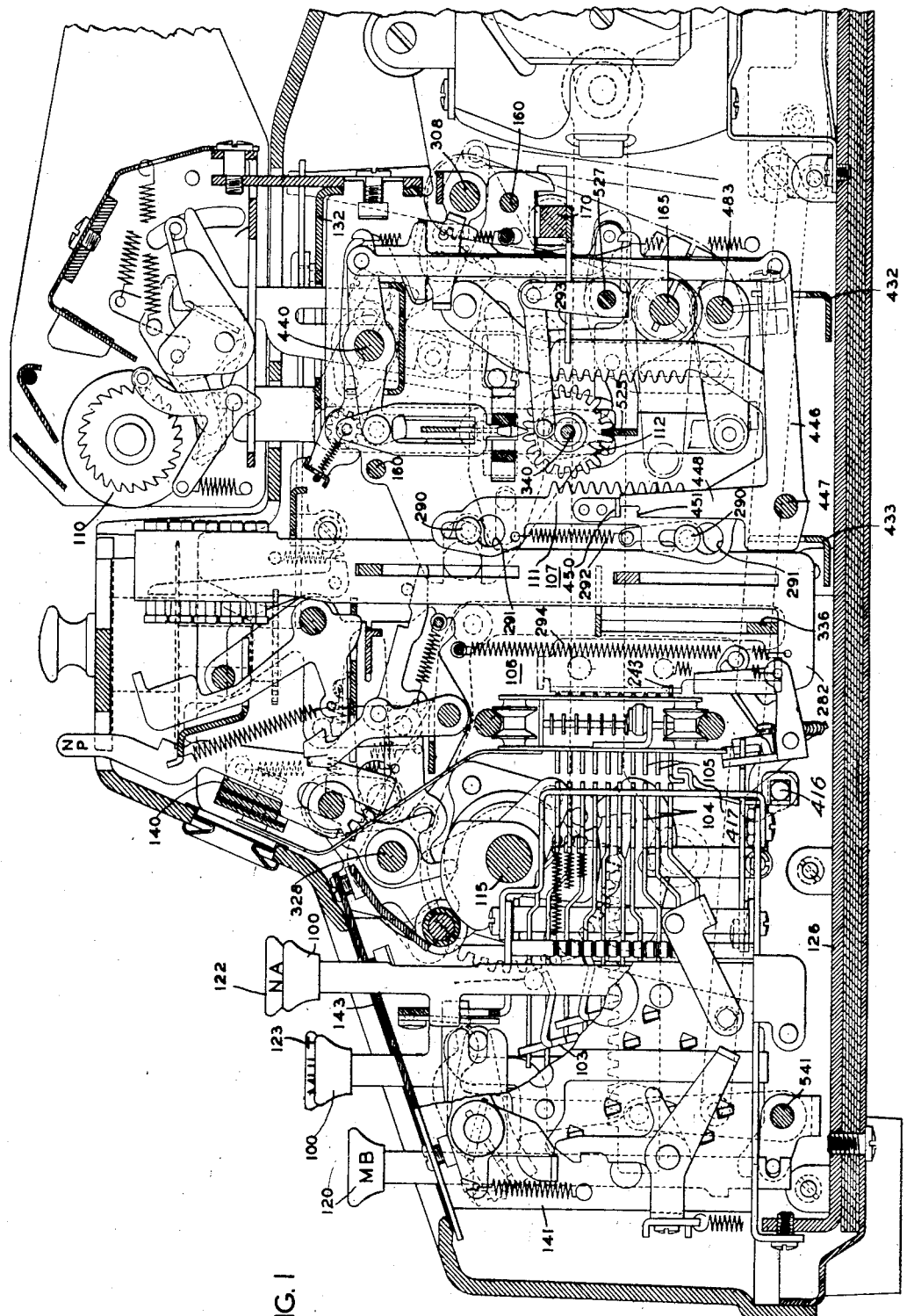
Fig. 1 is a front to rear vertical section through the machine.

Referring to Fig. 1, the machine shown in the drawings has, besides several control keys, ten numeral keys 100, whose sliding stems rock key levers 103, which control horizontal push bars 104, which set stops 105, arranged in vertical columns in a stop carriage 106 arranged at the back of the keyboard. Said carriage may be controlled by any suitable escapement and restoring mechanism. The stops 105 control the vertical differential motion of rack-carrying type bars 107, which, at their upper ends, bear types adapted to print on the front face of a platen 110. Each numeral type bar 107 has a double rack bar 111 mounted thereon with freedom of relative motion to the extent of one unit's distance. Each rack bar is made of U-shape, and each fork or leg of the bar has rack teeth on its inner vertical edge, the register wheel 112 being mounted between the two racks. In the present instance the forward rack 113 (Fig. 10) is used for addition and the rear rack 114 for subtraction.

The operating mechanism has for its principal element a main shaft 115, which has the usual rocking motion forward and back. It is equipped for operation by a handle, but in the present instance it is operated by a motor.

Figure 2:
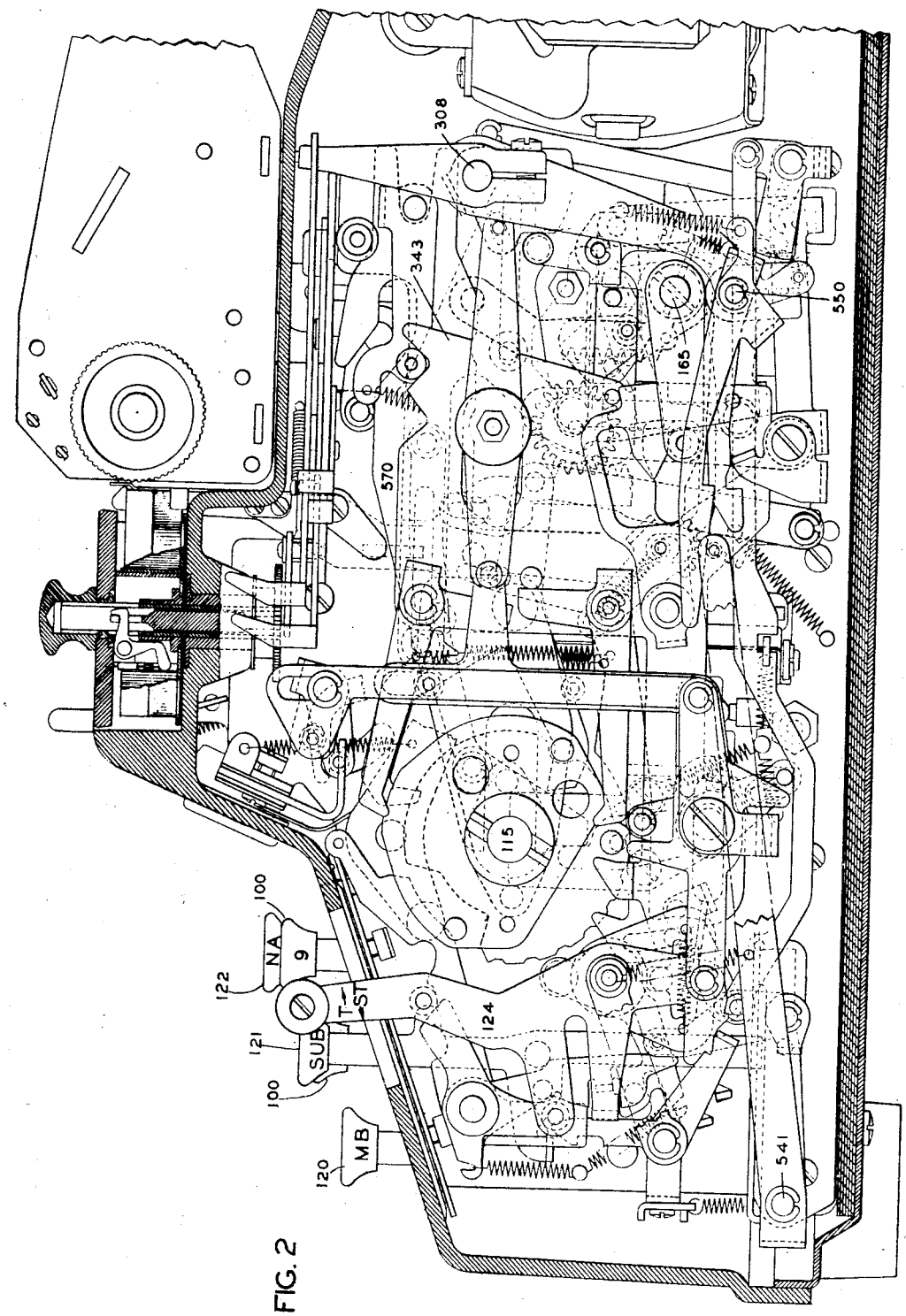
Fig. 2 is a right-hand side elevation with the casing shown in section.

The machine is equipped with a motor bar 120 to start the motor, a subtract key 121 (Figs. 2 and 10), a non-add key 122, a multiplying (repeat) key 123, a total and sub-total key 124 (Fig. 2) and a correction key.

*Framing*

An understanding of the mechanism of this machine will be facilitated by first considering the framework. The machine has a main frame and several detachable units or assemblies.

The main frame has for its principal members a base plate 126, (Figs. 1, 4, and 5) a left-hand side plate 127, a right-hand side plate 128, and a top plate 132 inter-locked with the side plates.

Figure 4:
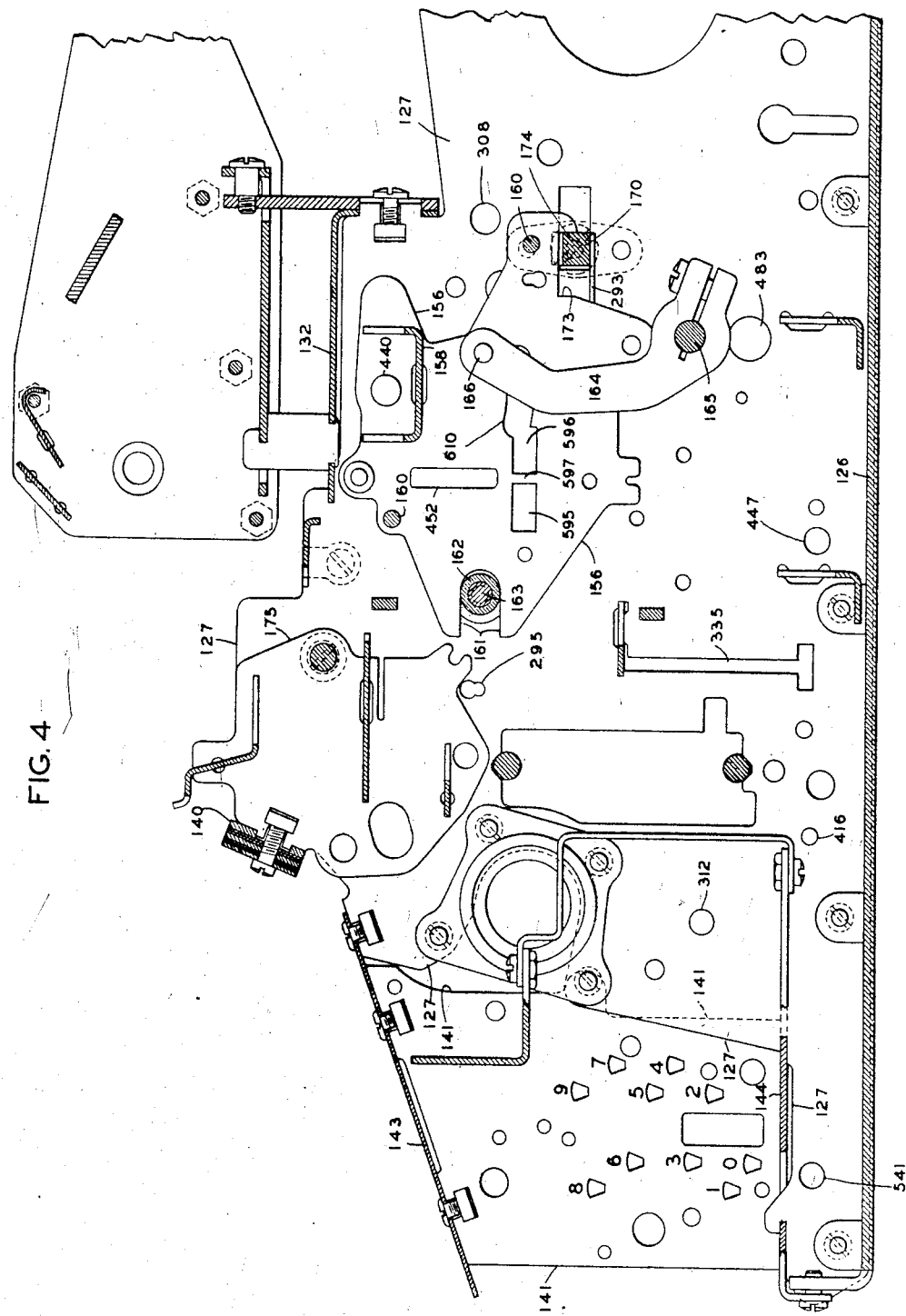
Fig. 4 is a front to rear vertical section showing the framework with nearly all of the movable mechanism removed.
Figure 5:
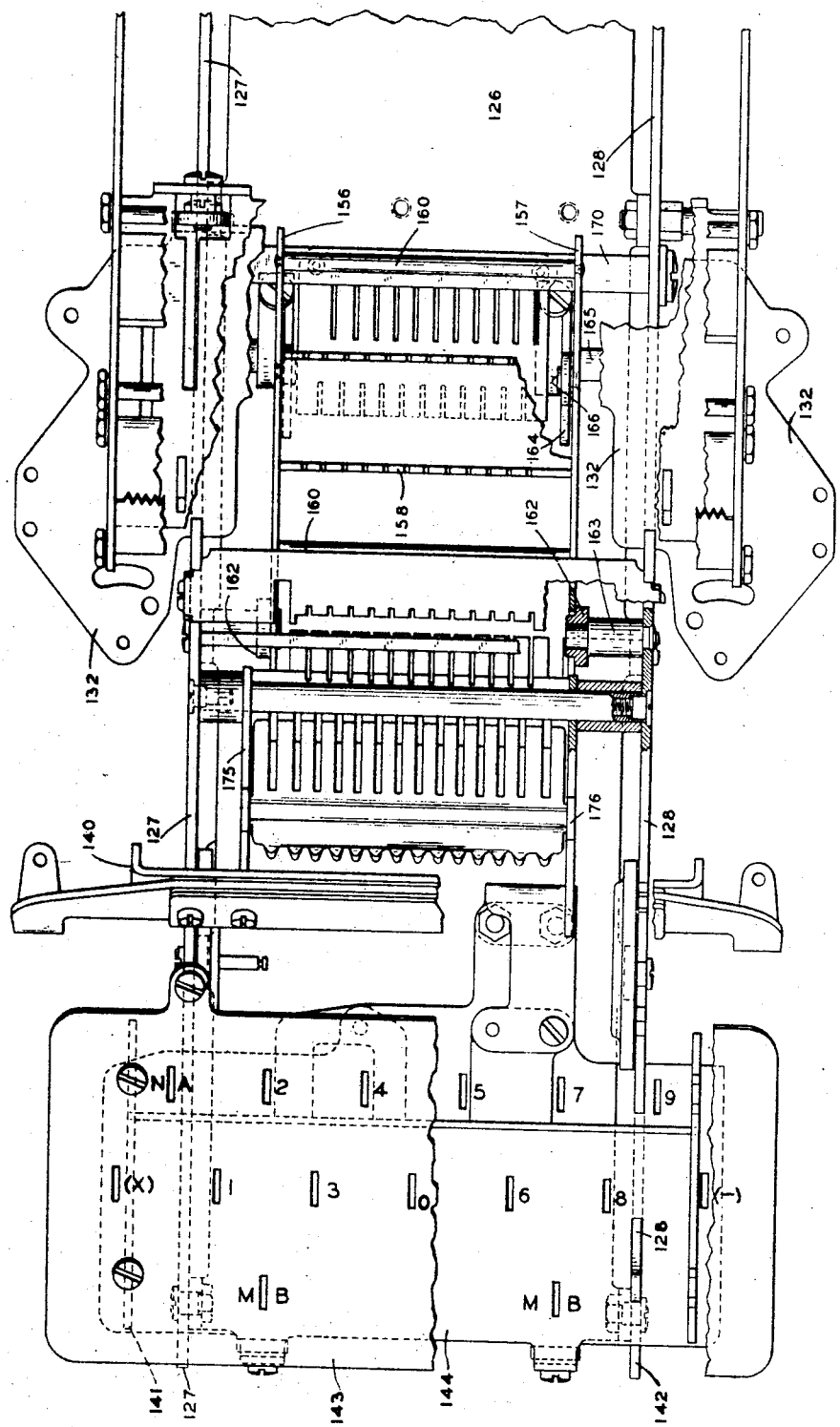
Fig. 5 is a top plan view of the same with some parts in section and some parts broken away.

Much of the mechanism of the machine is mounted in detachable units or assemblies, whose location can be understood from Figs. 4 and 5.

The frame of the keyboard section comprises two side plates 141 and 142 connected by a top plate 143 and a bottom plate 144.

The register section is mounted in the back part of the machine between the main side plates 127 and 128. Its framing includes left and right-hand side plates 156 and 157, respectively, Figs. 4 and 5. The principal transverse connecting member consists of a U-shaped double comb plate 158, secured at its ends to the side plates 156 and 157, and the side plates are also connected by two tie rods 160, the whole making a rigid frame. This frame, with the mechanism in it, is shiftable bodily to three positions, namely, a forward position shown in Fig. 4, where the register wheels 112 are in mesh with adding racks 113; a middle or neutral position where, as shown in Fig. 1, the wheels are out of mesh and a rear position where the wheels are in mesh with the subtracting racks 114. Each of the side plates 156, 157, has at its forward end an open-ended slot 161 which embraces an anti-friction roller 162, journalled on a shouldered stud 163. There are two of these studs, one projecting inward from each of the main side plates 127 and 128, and they constitute the supports and guide for the forward portion of the register frame. Said frame is supported and guided at its rear part by two arms 164 rigidly secured to and projecting upward from a transverse rock shaft 165, which is journalled in the main frame plates 127 and 128. Each of these arms is pivoted to one of the side plates 156 or 157 by a pivot stud 166 riveted into the side plate. The register section is shifted from one to another of its three positions by rocking the shaft 165.

A square cross bar 170, secured to the main side plate 127 and 128, has two slots in its upper surface, one for guiding each of the side plates 156, 157 against lateral deflection. The rear part of each side plate 156, 157 has two shoulders 173, 174, which, by contacting with the bar 170, limit the rearward and forward movements of the register section. The register section, with its mechanism assembled, may be removed bodily from the machine.

The hammer section has two side plates 175 and 176, which are secured to the cross bar 140.

The racks are best shown in Figs. 1 and 10. Each type bar 107 has projecting rearward therefrom two ears in which are mounted headed studs 290, which guide keyhole slots 291 in the forward member or branch of each of the rack bars 113, 114, for up and down sliding motion, the rack bar being drawn downward by a spring 292 attached at its lower end to a finger of the type bar. The rear branch of each rack bar is guided in a comb plate 293 projecting forward from the square cross bar 170 hereinbefore described. Each type bar is drawn upward by a long spring 294 attached to the arm 282 and anchored to a cross rod located at 295 (Fig. 4). The up and down motion of these type bars and racks is controlled by the operating mechanism by means to be described hereinafter.

Figure 3:
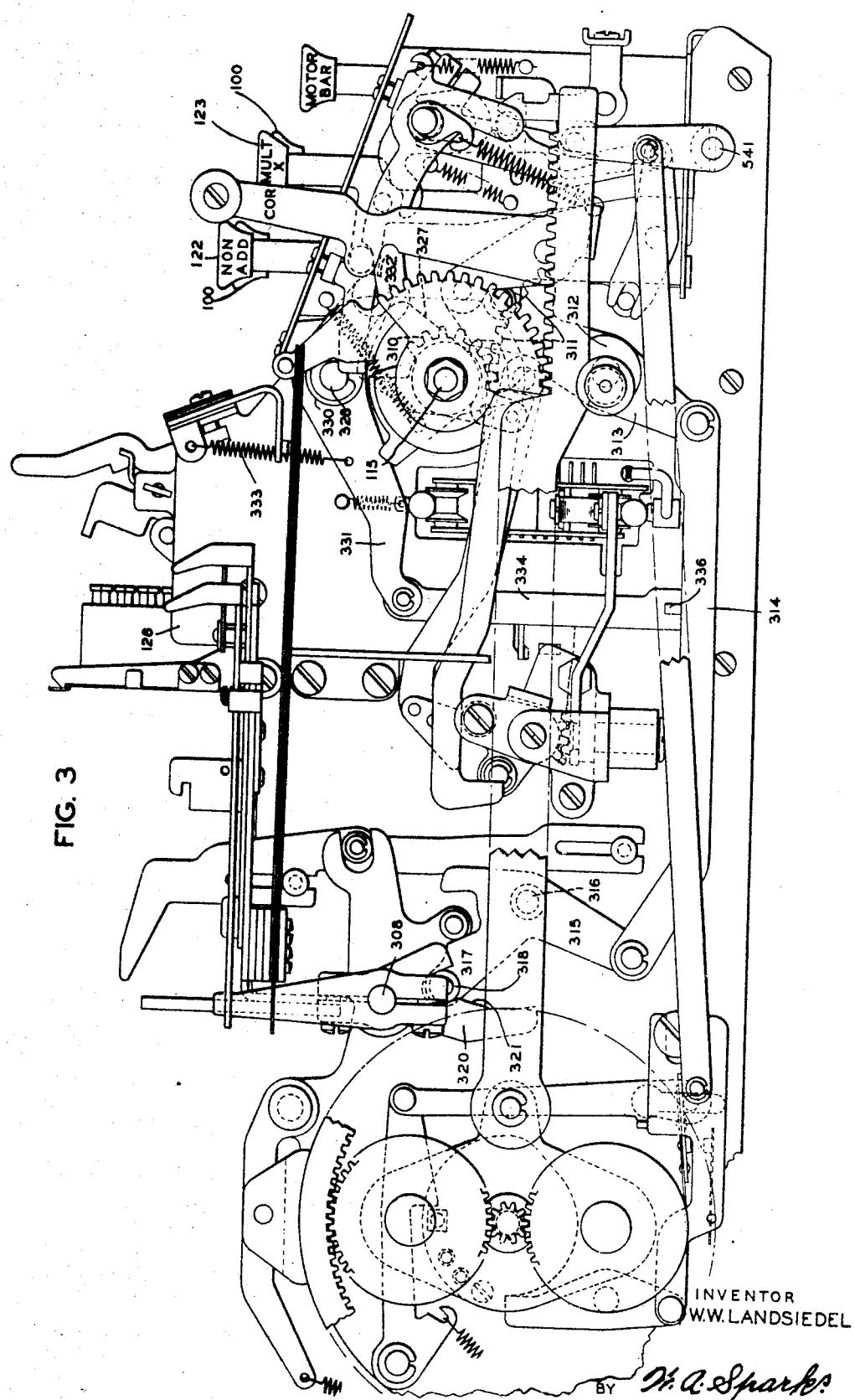
Fig. 3 is a left-hand side elevation with the casing and the paper-handling mechanism removed.

At the back of the machine there is a second rock shaft 308 (Fig. 3) which is rocked by the shaft 115 and which performs functions that will be described hereinafter. Outside of the main frame plate 127 there is mounted on the shaft 115 a segmental gear 310 (Fig. 3). This meshes with another segmental gear 311, which is pivoted to the side plate 127 at 312. This segmental gear has a downwardly extending arm 313, which is connected by a link 314 with an arm 315 of a lever which is pivoted to the side plate at 316. Said lever has an upwardly and rearwardly directed arm 317, which carries an anti-friction roller 318, which engages in a slot in an arm 320, which is fast on the shaft 308. Said slot is shallow and the arm 320 is prolonged beyond it with a curved surface 321, which, when the lever 320 is rocked, is concentric with the pivot 316. The construction is such that the shaft 308 is rocked clockwise in the first part of the forward motion of shaft 115 and remains stationary during the balance of the stroke while the roller 318 is running on the dwell 321. Shaft 308 is rocked back to its normal position in the last part of the return stroke of the main shaft.

The means whereby the type bars 107 are caused to rise, during the forward stroke, and to return to normal position, during the return stroke of the shaft 115, are best shown in Fig. 3. Just outside of each of the main frame plates 127 and 128 there is mounted on the shaft 115 a cam plate 327 having the outline shown in Fig. 3. A short distance above the shaft 115 there is transverse shaft or rod 328 projecting through the main frame plates. On each end thereof is journaled a hub 330 of a lever 331 of the first order, which lever has on its shorter forward arm an anti-friction roller 332 pressed against the periphery of the cam 327 by a spring 333. Each of the levers 327 extends rearward from the shaft 328 and has pivoted to its rear end a link or bar 334, which hangs down just outside the frame plate. Each of these frame plates has a long vertical slot 335 (Fig. 4) through which extends a transverse bar 336, which is suitably secured to the two links 334, and which bar extends across the machine above all of the arms 282 of the type bars, as shown in the drawing. The outline of the cam 327 is such that, during the first part of the forward rocking of the main shaft, the parts above described are stationary, the roller 332 riding on a concentric part of the cam. After the necessary preliminary operations have been performed, this roller runs down on the inclined rear edge of the cam and the bar 336 is allowed to rise, partly due to the tension of the two springs 333 and partly to the tension of the several springs 294, which elevate the individual type bars. On the return stroke of the main shaft the levers 327 are forced to rock counterclockwise in Fig. 3, thus forcibly depressing the bar 336 and all of the type bars.

*Mechanism for moving the register wheels into and out of mesh*

The register wheels 112 are mounted on a shaft 340 inserted through holes in the side plates 156 and 157 of the register frame. As said hereinbefore, this frame is mounted in part on the arms 164 fast on the shaft 165, and the register is shifted to its three positions, add, neutral, and subtract, by rocking said shaft. Said shaft extends through and some distance to the right of the main side plate 128, and on its end it has a forwardly extending arm 341 carrying a follower roller 342 (Fig. 10).

A main shifting plate 343 is slidably mounted on the main frame outside of the main frame plate 128 and spaced to the right of the latter somewhat less than an inch. The outline of this plate can be traced on Fig. 6 where it will be seen that it has a wide portion back of the main shaft 115, and a narrower portion projecting forwardly beneath said shaft. It is supported and guided for horizontal sliding motion by two grooved rollers 344 and 345 engaging in slots in the plate. This plate 343 is shiftable to two positions, viz., a forward normal position, shown in most of the drawings, and a rear position. It is yieldingly held in either position by a detent consisting of a roller 348 mounted on a spring-pressed arm.

The plate 343 has a cam slot or opening 353 into which projects the follower roller 342, which controls the shaft 165 and the register frame. The rear portion of this opening is of such width up and down, that the roller 342 can occupy in it a lower position shown in full lines in Fig. 6 and in which the register wheels will engage the forward or adding racks 113, as shown in Fig. 10, or an upper position, shown in Fig. 6 by broken lines, and in which the register wheels engage the rear or substraction racks 114. The opening 353 has its forward portion so shaped that, whenever the plate 343 is in its rear position shown in Fig. 8, the roller 342 is forced to its middle position in which the register wheels are positioned midway between the racks 113 and 114 and not in engagement with either.

The movement of the roller 342 from its neutral position, shown in Fig. 8, to its add or subtract position, as the case may be, is controlled by a switch cam 354 pivoted to the plate 343 on a stud 355 about which it can rock to an extent limited by two stop pins 356. This switch consists of a plate lying against the outer face of the plate 343 and having an opening through which the roller 342 passes. Projecting forward from the rear edge of this opening is a pointed cam finger 357. This finger and the opening 353 in the plate 343 are so designed that, when the switch 354 stands in its upper position, the lower edge of the finger and the lower edge of the opening 353 define a cam slot extending first at a downward inclination from the middle neutral position, and thence horizontally rearward; and, when said switch is in its lower position shown in Fig. 7, a cam slot is defined having a forward neutral dwell, then an upward incline, and then a rear dwell. When the plate 343 is in its rear position (Fig. 8), the switch can be swung either up for addition or down for subtraction, and, then, when the plate 343 is moved forward, the roller 342 will be cammed down or up as the case may be.

It will be perceived that, whenever the plate 343 is in its rear position, the register wheels are out of mesh with the racks, and, whenever said plate is in its forward position, the wheels are in mesh with either the racks 113 or 114, depending on the setting of the switch 354. In the present instance the means for shifting the plate 343 comprises three pins or studs projecting rightward from the cam plates 305 and 306, which are fast on the main shaft 115, viz., a comparatively short pin 360 and two longer pins 361 and 362. Their operation is illustrated diagrammatically in Figs. 6–9. Figs. 6 and 7 show the main shaft in normal position and Figs. 8 and 9 in its extreme operated position (end of forward stroke). The plate 343 has an ear or lug 363 so disposed that in normal position it stands just in front of the pin 361. The construction is such that, when the main shaft makes its return stroke from the position shown in Fig. 9 to that of Fig. 7, the pin 361 will, in the very last part of such return stroke, strike this lug 363 and force the plate 343 back to its active position, so that, when the main shaft 115 is in normal position, the register wheels are always in engagement. In Fig. 1 the shaft 115 is in normal position and the register wheels are in neutral. In practice, these two things would not occur at the same time, but are shown that way for clarity of illustration of the registering mechanism.

It will be noted in Fig. 8 that the pin 350 has passed to the rear of the front edge of the lug 363. This is the short pin, and said lug is off-set to the right so as not to stand in its path, but so as to be operated by the long pin 361.

In Figs. 6 and 8 the mechanism is shown set for computing operations (addition or subtraction). In these operations the plate 343 is shifted rearward to move the register wheels out of mesh at the first part of the forward stroke of the main shaft, and forward to throw them into mesh at the first part of the return stroke. The first of these movements is effected by the pin 361 acting on a dog 364 and the second by the pin 360 acting on a dog 365, both dogs pivoted to the shifting plate 343 on a stud 366. The dog 364 is on the outer face of the plate 343 and its end normally stands just back of the pin 361 in about the same plane as the lug 363. This dog can be depressed to the position shown in Fig. 7, where it is out of the path of pin 361 and, therefore, inactive. It is drawn upward by a spring until arrested in normal active position by a stop pin 367. In an adding or subtracting operation, in the first part of the forward stroke of the main shaft, the pin 361, acting on the end of dog 364, pushes the plate 343 to its neutral position, shown in Fig. 6, and the end of the dog then passes out of the circular path of the pin, which moves on free of the dog.

The dog 365 is mounted on the inner face of the plate 343, and its forward end is formed into a hook 368, having an abrupt rear edge, and an inclined forward edge, and in a plane where it can be reached by the short pin 360. In the last part of the forward stroke of the main shaft said pin 360 strikes the inclined edge of the hook 368, depressing it momentarily and then escapes beyond it, as shown in Fig. 8. In the first part of the return stroke, the pin 360 engages the abrupt rear face of hook 368 and draws the plate 343 forward to its active position, the hook 368 then passing out of the path of the pin. The dog 365 is drawn upward by a spring 370 against a stop pin 371 (Fig. 8). At its forward end it is guided by a grooved stud, projecting from the plate 343, so as to space it properly from said plate, said stud lying in a slot in the dog.

In total taking operations use is made of a third dog 373, pivoted at 374 to the upper part of the plate 343, and extending forward from said pivot. This dog is urged downward by the spring to the position shown in Fig. 7, where it is arrested by a stop pin 375, and where its free end is in the path of motion of the pin 362. In computing operations this dog is held in its upper position, shown in Figs. 6 and 8, where it is out of the path of said pin.

In Figs. 7 and 9 the dogs are shown set in position to take a total (with clearing). The dog 373 has been allowed to drop down to its operative position and the dogs 364 and 365 have been depressed to inoperative position out of the paths of the pins 361 and 360. Since the roller 342 is in its upper position in these figures, the machine is set for taking a negative total, the register wheels being initially in mesh with the subtracting racks 114. Since the dog 364 is out of the path of the pin 361, when the main shaft is rocked to the position, shown in Fig. 9, the shifting plate 343 will remain in its active position and the register wheels will, therefore, remain in mesh with the racks during the upward motion of the latter. During this motion the pin 362 snaps under the dog 373, which drops down behind it, as shown in Fig. 9. In the first part of the return stroke, therefore, this pin, acting on the dog 373, will push the shifting plate to its rear or neutral position, leaving the register wheels out of mesh with the racks during the return stroke of the latter. At the end of the return motion, the pin 361, engaging the lug 363, will draw the plate 343 back to its active position. As will appear hereinafter, the switch 354 will meanwhile have snapped back to its adding position so that, when the wheels are thrown into mesh at the end of the cycle, they will move into mesh with the adding racks.

It will be noted that, when the pins act on the dogs 364 and 373, the friction of the pins across the end of the dogs tends to press the latter back against their stops 367 and 375, which stops prevent the dogs from following the pins so that the latter escape from the ends of the dogs and proceed on their way.

In the total taking operation, just above described, if the dog 365 had been in its upper active position, the pin 360 engaging it early in the return stroke of the main shaft, would have endeavored to draw the plate 343 forward in opposition to the pin 362 and dog 373. It is, therefore, necessary that this dog 365 be in its depressed position during this operation.

The cooperating mechanism, involved in this total taking operation, is shown in Fig. 10 in the position it occupies, after the total key has been set, and before the main shaft has been rocked, but in this figure the machine indicates a positive total.

In Fig. 11 the parts are shown set for a total taking operation, and in the position they occupy early in the return stroke of the main shaft 115. Here the pin 362 has a little more than half completed the pushing of the dog 373 and plate 343 back to their neutral position. By the time the plate is entirely back, the pin in its circular motion will pass off of the end of the dog, leaving the register wheels out of mesh for the return stroke of the racks.

In order to take a sub-total, the dogs 364, 365, and 373 are all three set in inoperative position, with the result that, when the main shaft is rocked, the shifting plate 343 remains in its normal active position throughout the entire cycle, the register wheels remaining in mesh with the racks, during both the upward and downward motions of the latter, so that the total is printed and immediately rolled back into the wheels.

It may be said, however, that in this operation, it is immaterial whether the dog 365 be in its operative or in its inoperative position. As the plate 343 is already in its active position this dog would be inoperative even if it stood in its normal upper position.

The conditions for the various operations are, therefore, as follows: Adding or subtracting, dogs 364 and 365 active, dog 373 inactive. Total (with clearing), dogs 364 and 365 inactive, dog 373 active. Sub-total, dogs 364 and 373 inactive.

The total and sub-total key 124, consists of a lever which occupies a middle position (Fig. 2) when the machine is set for computing, a rear position (Figs. 10 and 11) when set for total taking and a forward position when set for sub-total. A link 391 pivoted to said lever slides on the pivot stud 393 of two nested bails 396 and 397. This link has a depending finger 395 standing behind the outer bail 397 (Fig. 12) so as to rock said bail clockwise (Fig. 10) when key 124 is set to total position. Said link also has an upper finger 394 which when key 124 is set to sub-total acts on a stud 398 on inner bail 396 and rocks the latter clockwise. Two upright slide bars 401 and 404 are pivoted respectively to horizontal arms of the bails 397 and 396 to be pulled down thereby against the resistance of springs. The inner bar 404 has a pin 407 which, when said bar is pulled down, depresses the connectors 364 and 365 out of the path of the pins 361, etc., and where they are, therefore, inactive. The outer bar 401 has a pin 406 projecting through a slot 405 in the bar 404 and thence into position where it normally holds the connector 373 up in inactive position (Fig. 2), but allows it to drop to active position when the bar moves downward. The pin 406 is normally in the bottom of the slot 405, so that the bar 401 can pull the bar 404 down, but the latter can move down independently of the former. When the key 124 is set to total position, bail 397 is rocked, pulling down bar 404; pin 407 depresses connectors 364 and 365, so that the plate 343 is not moved rearward on the forward stroke of the main shaft, and the register wheels remain in mesh; and pin 406 sets connector 373 to active position, with the result that the wheels are unmeshed in the first part of the return stroke of the shaft. When the key 124 is set for sub-total, the inner bail 396 and inner bar 404 are operated alone, setting connectors 364 and 365 to inactive, and leaving connector 373 also inactive, so that the slide 343 is not moved at all during the cycle and the register wheels remain in mesh on both the forward and the return strokes.

The total key 124 has other connections, most of which need not be mentioned here. It may be said, however, that the bail 396, which is rocked on both the total and sub-total settings, is articulated by pin and slot 414 (Fig. 13) with an arm on a rock-shaft 416 which shaft carries another arm 417 adapted to pull to inactive position the plate 243 (Fig. 1) in the pin carriage which plate constitutes the zero stop for the type bars when said carriage is in its right-hand position.

*Register and transfer mechanism*

In the specific machine illustrated in the drawings, the register wheels 112 have twenty teeth each (Figs. 1 and 16) and are of 30 diametral pitch. Each of them has at its left-hand side the usual two transfer teeth 435 usually made by stamping up a thickened part of the wheel terminating at each end in a tooth integral with one of the gear teeth of the register wheel.

The transfer mechanism comprises a series of dogs 436, each pivoted at 437 to a horizontal lever 438 of the first order, said levers being pivoted on a shaft or rod 440 mounted in the two side plates 156 and 157 of the register frame, guided in the double comb plate 158, and urged clockwise in Fig. 16 by a tension spring 442 which, at its lower end, is connected to a cross rod 443 mounted in the two side plates 156 and 157, the tension of these springs tending to move the dogs 436 upward radially of the wheels. The rear arm of each lever 438 has pivoted thereto the upper end of a long link 444 which, at its lower end at 445, is pivoted to the rear end of the horizontal arm 446 of a bell-crank, all of said bell-cranks being pivoted side by side on a cross rod 447 supported by the main side plate 127 and 128, and said bell-cranks guided by comb plates 432 and 433 (Fig. 1). The upstanding arms 448 of said bell-cranks have their upper ends adapted to act as stops for brackets 450, each said bracket being mounted on the right-hand face of one of the rack bars 111. Each of the lever arms 448 has a shoulder 451 situated below the extreme end of the lever a distance equal to one tooth space of the rack. The whole construction is such that, when one of the dogs 436 is released, as presently to be described and is allowed to be moved upward by its spring 442, the upper end of the lever arm 448 will be swung rearward out of the path of bracket 450 and allow the racks 113 and 114 to drop down a tooth space beyond normal until arrested on the shoulder 451. It will be recognized that this transfer mechanism works on the known general principle of allowing to the actuating rack an extra step of movement in case of transfer.

Each of the dogs 436 has a long up and down cut-out 452, the dog below such cut-out projecting downward in the form of a tooth 453, which tooth, when the dog is in normal position, lies in the path of the transfer teeth 435 of the associated register wheel. A comb plate 454 extends through the series of cut-outs 452 in the dogs and is supported at its ends in a manner to be presently described. The teeth of this comb plate project downward, and the portion of each dog 436 below the cut-out 452 is guided in a slot of this comb plate. The tooth 453 has stamped up from its right-hand face a lug 455 which, when the dog is in its normal position, lies beneath the end of one of the teeth of the comb 454, which comb-tooth thus acts as a stop for the dog; and it is this which normally prevents the upward motion of the dog under the pressure of the spring 442. The width of the cut-out 452 is such that, if the wheel 112 is turning counter-clockwise in Fig. 16 in an adding operation and the transfer tooth 435 strikes the tooth 453 of the dog, said dog will be swung toward the front of the machine about its pivot 437. This will move the lug 455 out from under the comb tooth and permit the dog 436 to move upward, its lug 455 sliding up the front surface of the comb-tooth; swinging the bell-crank 446, 448 clockwise in Fig. 1, and thus effecting a transfer to the next rack and wheel to the left. Also, if, when the register wheel is turning clockwise in subtraction, one of the transfer teeth passes the tooth 453, it will throw said tooth rearward, which motion will also move the lug 455 from beneath the comb-tooth and permit a transfer the same as before, said lug sliding up the rear surface of the comb-tooth. It will be perceived that the transfer tooth 435 does not have a camming action on the dog but merely pushes the latter free of its stop, the action of said tooth on said dog being like that of one gear tooth on another.

It will be understood that the levers 438 are mounted in the register frame, which has a shifting movement front and back, whereas the bell-cranks 446, 448 are pivoted in the main frame. During the shifting movements of the register frame, the links 444 swing about their lower pivots 445 as a center.

Unless means to the contrary were provided, the hold of the lug 455 on the lower end of the tooth of the comb 454 would be a precarious one. Also, in total taking the transfer tooth 435 must be arrested by the tooth 453. Settable abutments for the dogs are, therefore, provided, consisting of two cross bars 456 and 457, one extending in front of, and the other behind, all of the dog teeth 453 with sufficient space between them to permit of the necessary swinging motion of the dogs. As will be explained hereinafter (Figs. 27 and 28) these cross bars extend through horizontal slots 458 in the frame plates 156 and 157, and they are shiftable to two positions. When the machine is set for addition, as shown in Fig. 16, the rear bar 457 is in contact with the rear edges of all of the teeth 453, whereas, when the machine is set for subtraction, these bars are shifted rearward so that the bar 456 is in contact with the forward edges of all of the teeth 453. Thus, when the machine is set for addition, the dogs 436 can swing forward, but not rearward, and vice versa when the machine is set for subtraction. Also, each of the dogs 436 is prolonged above its pivot, where it is influenced by a spring 460. These springs are all hooked to a bail 461 (Figs. 1 and 22), the arms of which are pivoted to the side plates 156 and 157. When the machine is set for addition this bail is inclined toward the front of the machine, so that, as shown in Fig. 16, the springs 460 tend to rock the dogs 436 counter-clockwise, thus pressing their teeth 453 against the cross bar 457. When, however, the machine is set for subtraction this bail is swung rearward causing all of the springs 460 to exert their tension clockwise, thus pressing the teeth 453 against the cross bar 456. When one of the dogs is tripped to effect a transfer the motion of the lever 438 is limited by the comb 432.

In taking a positive total the wheels are set as in Fig. 16, and they turn clockwise, so that, when the transfer tooth 435 strikes the dog tooth 453, the latter is prevented from motion in that direction by the bar 457 and the wheel is, therefore, arrested at zero. Also, in taking a negative total the wheels would turn counter-clockwise and would be arrested at their negative zero positions by a tooth 435 striking a tooth 453, which is then held against displacement by the bar 456.

Means for re-setting the transfer mechanism after the operation thereof are shown in Figs. 22, 24, and 25.

Referring to Fig. 16 a transfer operation would cause the dog 436 to be deflected leftward in that figure, and the lug or block 455 would move upward, sliding along the left-hand surface of the comb tooth, said block being pressed against said tooth by the tension of the spring 460. The parts will be restored to normal position, if the comb plate 454 be moved bodily upward, until the lower edge of the tooth reaches a height above the upper position of the block 455. The spring 460 will then cause the dog to snap toward the right, until arrested by the bar 457. If then the comb 454 be depressed to its normal position, it will pull the dog downward and restore all of the parts of the transfer mechanism to normal. This operation is performed in computing operations during the forward stroke of the main shaft, at which time the register wheels are out of mesh.

On the main shaft 115 there is mounted an arm 463, Fig. 24, to which a link 464 is pivoted on a stud 465 of said arm, which stud projects into a slot in the link to afford a slight lost motion. The link 464 is pivoted at 466 (Figs. 24 and 25) to a sliding cam plate 467, which has two guide slots 468 and 470 by which it is guided on two studs 471 and 472 projecting leftward from the right-hand main frame plate 128. This plate 467 is, therefore, situated between the main side plate 128 and the right-hand side plate 157 of the register frame. The construction is such that on the forward stroke of the main shaft the cam plate 467 slides some distance toward the front of the machine and slides back during the return stroke. This plate has therein a cam slot 473 in which plays a follower roller 474. The upper edge of this slot extends first horizontally, then upward at an inclination, thence a short distance horizontally, thence downward at an inclination, thence horizontally. A cam plate or dog 475 (Fig. 25) is pivoted to the plate 467 at 476 and its motion clockwise about said pivot is limited by a stop 477. The upper edge of this dog is so shaped that, when the dog is in normal position, shown in the drawings, it supplies the lower edge of a cam slot in the plate 467, said slot being of a width about equal to the diameter of the roller 474. The whole construction is such that, when the plate 467 is drawn forward, the plate 475 remains in normal position because it is arrested by the stop 477. The roller, therefore, is for a moment quiescent, then moves upward, and then downward into a dwell at the right-hand end of the slot. On the return stroke the plate 475 yields about its pivot and allows the roller 474 to remain stationary during the return stroke, except as will be hereinafter mentioned. This roller 474 is connected to the comb plate 454 by the following means. Said roller is journaled on a stud projecting leftward from a lever arm 478 (Fig. 24) pivoted to the outside face of the frame plate 128, the roller projecting through a slot 480 in said plate. The arm 478 is connected by a link 481 with an arm 482 fixed to and projecting forward from a rock shaft 483 which is journaled in the two side plates 127 and 128. The shaft 483 has mounted thereon two arms 484 (Fig. 22) to each of which is pivoted a link 485 extending upward, one of these links being at the right-hand side of the right-hand register frame plate 157, and the other at the left-hand side of the left-hand register frame plate 156. In other words, these two links come up on the outsides of the register frame. Each of them at its upper end is pivoted at 486 to a slide 487, which slide has at its upper end a slot 488 by which it is guided on the stud 490 on which the bail 461 is pivoted. At its lower end the slide 487 has an open ended slot, which is guided by a headed stud 491 projecting from the side plate of the register frame. The ends of the comb plate 454 project through openings in the side plate of the register frame and are secured in these sliding bars 487, as shown in Fig. 22. It will be perceived that on the forward stroke of the main shaft 115 this comb plate 454 will move first upward to allow any displaced transfer dog 436 to snap in under it, and will then be depressed to its lower position, thus resetting the dogs 436, the levers 438, links 444 and transfer bell-cranks 446, 448.

The cam plate 475 is restored to and held in normal position by a spring. For reasons which will presently appear this is effected in the following manner. Said plate 475 has a stud 492 (Fig. 25) projecting therefrom into a long slot 493 in a lever arm 494, which is pivoted on the inside of the frame plate 128 at 495. A rear arm of this lever is drawn downward by a spring which, acting through the stud 492, controls the plate 475. This stud slides in the slot 493 during the sliding motion of the plate 467.

It will be noted in Fig. 25 that the right-hand end of the cam slot 473 stands at a slightly lower level than the left-hand end of said slot so that the comb plate 454 stands a little higher, when the shaft 115 is in normal position, than it does at and near the end of the forward stroke of said shaft. The reason for this is as follows: the lower end of the dog tooth 453 is somewhat tapered and in the normal position of said tooth, shown in Fig. 16, and in the nine and zero positions of the transfer tooth 435, there is a slight clearance between these two teeth. This is of some importance as otherwise a slight over-throw of a register wheel, when it should be arrested in the nine position, might cause the tooth 435 to strike the tooth 453 a blow, which would knock said tooth and the dog 436 free from the comb 454, and cause a transfer when the register wheel did not pass from nine to zero. This clearance is, however, a disadvantage when the tooth 453 is used to arrest the register wheel at zero position at total taking. In that operation the wheel, the rack and the type bar, should be arrested with a degree of precision which would be spoiled by looseness at the point indicated. The printing of the total takes place about the beginning of the return stroke of the main shaft, at which time the cam plate 467 is in its forward position, and the roller 474 occupies the right-hand end of the slot 473 in Fig. 25, and the comb plate 454 and all of the transfer dogs are, therefore, pushed downward lower than they are shown in Fig. 16, so as to take up some of the clearance or lost motion above described, and so as to arrest the type bars more exactly in proper position. Additional means for taking up this clearance will be described hereinafter.

In a total taking operation the register wheels are in mesh during the forward stroke of the main shaft, and it is necessary that the dogs 436 be standing in position to arrest them, and it is, therefore, necessary that the dogs be not raised during the forward stroke of the main shaft in that operation. In a total taking operation, therefore, the plate 475 is swung downward about its pivot 476 out of the path of the roller 474, so that it does not act to elevate said roller. This is effected by the following means. It will be recalled that, during both total taking and sub-total taking operations, the slide 404 occupies a depressed position shown, for example, in Fig. 10. This slide is made with a rearwardly projecting arm or extension 496, which has a stud 497 projecting into a slot in the end of a lever 498, which is pivoted on the outer end of the post 346 which, among other things, serves as one of the guides for the shifting plate 343. At its rear end this lever has a stud 500 projecting into a slot in a cam plate 501, a portion of which is made bail-shaped so as to give it a two-point bearing on the shaft 308 at the rear of the machine. This cam plate 501 normally stands in the position shown in Fig. 24 but, when the total key 124 is set, either for taking a total or for taking a sub-total, the parts just described are rocked to the positions shown, for example in Fig. 10. The cam plate 501 controls a follower roller 502 mounted on a lever 503 (Fig. 10) which is pivoted on a stud 504, projecting rightwardly from the right-hand frame plate 128. This lever is of somewhat complicated shape which can, however, be readily understood from the drawings. It is pivoted on the stud at two points, its upwardly extending arm being near the end of the stud and its downwardly extending arm near the plate 128 and the two arms being connected by a bail bar 505. The depending arm of the lever 503 is offset at 506, Figs. 24 and 25, this offset portion extending through a slot 507 in the frame plate 128, so that the extreme lower end of the lever extends inside of the frame plate as shown in Fig. 24. The lever 494 is also pivoted on its stud 495 at two points connected by a bail bar 508 (Fig. 25) and the outer branch of this lever includes an arm 510, which lies in the path of motion of the horizontal offset portion 506 of the lever 503. The whole construction is such that when the plate 501 is rocked by the operation of the total key the lever 503 swings counter-clockwise in Figs. 24 and 25, and the portion 506 thereof, striking the lever arm 510, rocks the lever 494 counter-clockwise to a position where its slot 493 is about horizontal and where it rocks the cam plate 475 out of the path of the follower roller 474. During the total taking operation, therefore, there is nothing to force the comb plate 454 to its upper position.

However, the tension of all of the springs 442 of the transfer mechanism tends to raise this plate and it is, therefore, necessary positively to hold it down at certain times. To this end the following means are provided—the shifting plate 343 has bent off from the lower portion of the rear edge thereof an ear 511 as best shown in Fig. 21. This ear is bent first toward the left and then toward the front of the machine so that the active part of it is in the plane of a roller 512, journaled on the end of the rocking arm 482, as best shown in Fig. 24, where the ear 511 is also shown. The lower edge of this ear is made of truncated V-shape so as to act as a cam on said roller and to hold it down whenever the plate 343 is in its forward position, which it is at two of the times when it is desired that the comb 454 is held down, namely, during the forward operating stroke in total-taking operations and during the return stroke in computing operations.

During the return stroke in total-taking operations the plate 343 occupies its rear position, and the cam ear 511 is, therefore, not over the roller 512. In order to prevent the upward motion of the comb plate at that time, the following means are provided. The arm 482 has an ear 513 bent off leftward from its lower edge so as to serve as a flange or shelf, and a locking dog 514, Figs. 24 and 26, is pivoted to the frame plate 128 on a stud 515. This dog has a forwardly directed arm to which is attached a spring 516 which tends to hold the dog out of engagement with the flange 513. The stud 477, Fig. 25, which is mounted on the cam slide 467, projects through the opening 480 in the plate 128, and, as this stud moves toward the front of the machine, it engages a cam portion 517 on the dog 514 and rocks it against the tension of its spring into position to block the upward motion of the flange 513. A latch lever 518 is pivoted on the shaft 165 and its forwardly extending end drawn downward by a spring 520. This latch lever has an upwardly extending arm, which, when the parts are returning to normal position, is struck by the stud 477 and the latch is thereby rocked counter-clockwise against its spring 520. As soon as the slide 467 and its stud 477 begin their forward movement this lever is allowed to drop down, and, when the locking dog 514 is moved to its operating position, it is locked thereby the latch engaging an ear 521 of said lever. The dog 514, therefore, locks the comb plate 454 in its lower position during every return stroke of the main shaft. At the end of the return stroke the stud 477 releases the latch 518 and the latch 514 is then drawn to releasing position by its spring 516. In order to insure the releasing of the latch 514 the latch 518 is prolonged forward, and its forward end is adapted to strike a stud 522 on the latch 514 and positively move the latter out of engagement.

The whole construction is such that, in computing operations in the first part of the forward stroke of the main shaft, the register wheels are moved to their middle inactive position, after which the comb plate 454 is moved upward so as to allow any displaced dogs 436 to snap back into engagement with it, and it is then moved downward to a position a little below its normal position. Early in the return stroke of the main shaft the comb plate makes a slight upward motion to its normal position, where it remains during the balance of the cycle. In total taking operations the comb plate is held in its normal position by the cam ear 511 during most of the forward stroke of the main shaft, is then slightly depressed, and, early in the return stroke of the handle, returns slightly upward to its normal position where it remains during the balance of the cycle.

An aligning bar 525, Figs. 1 and 21, moves into engagement with the register wheels whenever the latter move out of mesh and out of engagement when they move into mesh. This bar is in the nature of a bail, whose arms 526 are pivoted on the outsides of the frame plates 156 and 157 of the register frame on the projecting ends of a cross shaft or rod 527, and they are drawn upward to move the aligning bar into mesh with the wheels by springs 528. One of the arms 526 is extended rearward and is connected by a link 530 with a lever arm 531 pivoted to the outside of the right-hand frame plate 128 on a stud or post 532. The free end of this arm is bent leftward through an opening in the frame plate 128, and the link 530 is pivoted to an ear bent up from this leftward extension. This lever is in the nature of a bell-crank whose horizontal arm is near the frame plate 128, and whose upstanding arm 533, Fig. 21, is nearer to the shifting plate 343, the two arms being connected by a bail bar 534. A stud 535 on the shifting plate 343 is adapted when said plate is moved toward the front of the machine to rock the lever arm 533 forward, and the lever arm 531 upward, and thus to move the aligning bar 525 out of engagement with the wheels. When the shifting plate is moved to its rear position, the stud 535 moves away from the lever arm and permits the springs to move the aligning bar into engagement. It will be noted that these movements of the aligning bar require for their performance only that small part of the shifting movement of the plate 343 in which the follower roller 342, which shifts the register, is still in the dwell at the end of its cam slot, so that the aligning bar moves into the wheels while the latter are still in mesh with their racks, and remains in engagement until they have been re-engaged. As the plate 343 is always in its forward position when the wheels are in engagement, and in its rear position, when they are out of engagement, it shifts the aligning bar at the proper time.

Subtraction

From the foregoing description it will be understood that in order to set the machine for a subtracting operation, it is necessary to do three things, viz.:

(a) The switch 354 must be swung to its lower position shown in Fig. 7. This will result in the register wheels being drawn into mesh with the subtraction racks 114 instead of the addition racks 113.

(b) The bars 456 and 457 must be slid rearward from the adding position shown in Figs. 16 and 27 to the subtracting position.

(c) The bail 451 must be swung rearward from the position shown in Fig. 22 to reverse the action of the springs 460 on the dogs 436.

In the present machine these things are done in computing operations by the operating mechanism under the control of the subtraction key 121. This key (Fig. 29) has its stem 540 guided like the other stems in the top plate 143 and bottom plate 144 of the keyboard section at the extreme right-hand part of the keyboard as indicated by the mark (—) in Fig. 5. Beneath the keyboard section a transverse shaft 541 is supported by the main frame plates 127 and 128. On this shaft there is loosely pivoted a lever consisting of a long outer arm 542 and a shorter inner arm 543 connected by a bail bar 544. Said inner arm has a stud 545 lying beneath the end of the key stem 540 and by which, when the key is depressed, the lever arms are swung downward against the tension of a spring 546. The arm 542 at its rear end has a stud 547 on which rests the prolonged end of a pawl or hook 548, which is pivoted at 550 to an arm 551, depending from and fast on the rock shaft 308 and influenced by a spring 552. As explained hereinbefore this shaft is rocked counter-clockwise in Fig. 29, in the first part of the forward stroke of the main shaft 115, and remains in rocked position until it is restored in the last part of the return stroke of the main shaft.

The switch 354 has a stud 553 projecting therefrom through a slot 554 in the shifting plate 343, and a tension spring 555 connects this stud with a stud 556 on a device 557, which is pivoted on a post 558, projecting from the main frame plate 128 and normally holds the switch 354 in its upper or add position. The device 557 is part of a pivoted device consisting of two arms connected by a bail bar, said device lying a little to the left of the shifting plate 343 and the other arm lying adjacent to the sideplate 128 and being in the nature of a gear sector 560. The latter meshes with another gear sector 561 constituting a part of another piece pivoted at 562 on a post projecting from the side plate 128. This device is also made in the form of a bail, its outer arm 563 having an ear 564 bent off therefrom and lying beneath the hook 548. This device is drawn counter-clockwise in Fig. 29 by a spring 565 against a stop 566. The construction is such that, when the subtraction key 121 is depressed, the hook 548 drops down until it rests on the ear 564. When, in the first part of the forward stroke of the main shaft, the arm 551 moves rearward, said hook rocks the device 563, 561 clockwise and the device 560, 557 counter-clockwise. The parts are shown in Fig. 29 in adding position, with the spring 555, drawing the switch 354 against the upper stop 356; but, when the arm 557 is swung counter-clockwise, the spring pulls downward and tends to swing the switch down against the lower stop 356, as shown in Fig. 7. The switch will swing down as soon as, in the rearward motion of the shifting plate 343, the roller 342 is out of the way. When, in the return stroke of the main shaft, the plate 343 is moved forward to its active position, the roller 342 will enter the upper branch of the switch and move the register wheels into mesh with the subtracting racks 114.

In order to shift the bars 456 and 457 (Figs. 16, 27, and 28) and to shift the spring-anchor bail 461, a special cam plate 570 is provided (Figs. 23 and 29). This plate is mounted for sliding motion front and back guided by a roller 571 on the main shaft 115, and on two guide rolls 572 on posts projecting from the frame plate 128. A forked actuating dog 573 is pivoted to the plate 570 at 574 and its rocking motion is guided and limited by a headed stud 575 playing in a slot in the plate. A two-armed device or plate 576, fast on the main shaft 115, has two studs 577 and 578 projecting into the plane of the dog 573. Said dog has an arm 580 which is connected by a link 581 with a portion of the gear sector 561. The construction is such that, when said sector stands in the addition position shown in Fig. 29, the abrupt end 582 of the lower fork of the dog 573 is in the path of movement of the stud 577, but, when in a subtraction operation the sector 561 is swung clockwise, the dog 573 is swung counter-clockwise, bringing a hook 583 of the upper arm of said dog into the path of the stud 578, which, in the latter part of the forward motion of the main shaft, will pull the slide 570 to its forward or subtraction position. The subtraction key is automatically released and returns to normal position in the last part of the return stroke of the operating shaft. As hereinbefore explained, the arm 551 and hook 548 move forward to normal position near the end of such return motion, thus releasing the parts to the action of the spring 565, which will return the springs 555 and dog 573 to normal position. However, the studs 577 and 578 are already nearly to normal position, so that the slide 570 will remain in subtraction position until the next operation of the machine in which, if it be an adding operation, the stud 577 will strike the abrupt end 582 of the dog and push the plate back to addition position in the latter portion of the forward stroke of the shaft 115. It will be noted that the shifting of the plate 570 takes place on the forward stroke of the shaft 115 at which time the register wheels are out of mesh. The machine includes an interlock which prevents the total key and the subtract key from ever being both in operated position at the same time. Means are provided whereby, if the operating mechanism be actuated for an idle cycle when no numeral key has been depressed and when the subtract key is in normal position, the mechanism will be automatically set in subtract condition provided the register contains a negative balance; and it is only after an idle cycle that the total key can be operated. The mechanism remains throughout the total stroke in its plus or minus setting, and, therefore, the plate 570 is never shifted in a total-taking operation. It, therefore, takes place only when the register wheels are out of mesh. The means just referred to are shown in the drawings but not described in detail here. They are fully described in the parent application.

As shown in Fig. 23, the cam plate 570 has a cam edge, including an upper horizontal dwell 584, a downward incline 585, and a lower horizontal dwell 586, the latter two positions being covered by a similarly formed cam finger 587. The cam thus constructed controls a follower roller 588 mounted on an arm 590 fixed to a transverse rock shaft 591 journaled in the side plates of the register frame. Said shaft projects through a cutout (Fig. 24) in the side plate 128, outside of which the arm 590 is situated. The construction is such that, when the plate 570 is moved to subtraction position, the shaft 591 is rocked counter-clockwise. The dwells 584 and 586 are such that in either position of the plate 570, the roller 590 can move along them, when the register is shifted into and out of mesh, without affecting the shaft 591.

As best shown in Fig. 22, the shaft 591 has fixed thereon a gear sector 592, meshing with a pinion 593 fixed to one of the arms of the spring-holding bail 461, whereby said bail is swung clockwise to a subtraction position when the plate 570 is drawn forward and back to addition position when said plate is pushed rearward.

Said shaft 591 also has at each side of the register frame a depending arm 594 (Fig. 22) which arms shift the bars 456 and 457 hereinbefore referred to. Each of said bars has the cross-section shown in Fig. 16, but at each end it is widened out as shown in Fig. 27, those ends sliding in guide slots 595 and 596 (Fig. 4) in the side plates 156 and 157, the adjacent ends of said slots being separated by a sort of bar or spacer 597. At each end the two bars 456 and 457 are connected by a tension spring 598 passing through holes in the bars and secured to pins 600 seated in notches in the bars. Each of said bars has its reduced ends 601 projecting through the register side plates and through controlling sliding plates 602 sliding on rollers 603 on the side plates 156 and 157. Each plate 602 has two openings 604 and 605 into which respectively the bars 456 and 457 extend, said openings being separated by a spacer or bar 606 of the slide. Said slide also has an opening 607 into which a stud 608 projects from the arm 594, the side plates 156 and 157 having cut-outs 610 for said stud. The construction is such as to have the following mode of operation: The parts are shown in Figs. 27 and 28 set for addition. The stud 608 is pressing the slide 602 firmly leftward, bringing the bar 457 into contact with the spacer 597. The spacer 606 is holding the bar 456 away, against the tension of the springs 598. When, in a subtracting operation, the arm 594 swings to the right, the springs 598 will cause the bar 456 and slides 602 to follow the stud 608 until said bar is arrested by the teeth 453 of the transfer dogs 436. Each stud 608 will then move free till it encounters the right-hand end of the opening 607, and it will continue to move, drawing the slide 602 with it until the spacer 606 has drawn bar 457 away and the left-hand end of the opening 604 has pressed the end 691 of the bar 456 up to the spacer 597 of the side plate 157. The parts are then in the same relative positions but in reverse, as shown in Figs. 27 and 28. At the time when the abutments 456 and 457 are being shifted as above described, the bail 461 (Fig. 22) is being swung over to reverse the action of the springs 460. The abutment 457 remains in holding position as long as the springs tend to swing the dogs 436 counter-clockwise in Fig. 16, and by the time said springs begin to tend to swing them clockwise the abutment 456 is in position to hold them. Said springs, therefore, do not displace the dogs 456 during the shifting movement.

The teeth 453 of the transfer dogs 454 are slightly wider than the spacer 597 of the side plates 156 and 157, and an important advantage results from that fact. To illustrate what is meant, in the particular machine from which the drawings are made, each tooth 453 has a width in inches of .090, whereas each spacer 597 has a width of .070. When, therefore, the parts are set for addition as shown in Figs. 27 and 28, the right-hand edges of the teeth 453 are in alignment with the right-hand edges of the spacers 597, but the left-hand edges of said teeth project .020 beyond the same edges of said spacers, and when the bar 456 is drawn up snug against the spacers 597 in setting for subtraction, all of the transfer teeth are pushed .020 to the right. As hereinbefore mentioned, one of the troubles sometimes encountered in adding machines is due to an overthrowing of the register wheel when it is brought to the "9" position, resulting in a transfer tooth 435 giving a sharp tap against the tooth 453 and knocking the latter free of the comb 454. The device just above described sets the tooth 453 a little nearer the front of the machine in addition, and a little nearer the rear of the machine in subtraction, so as to avoid this danger. Moreover, in total taking, the opposite difficulty occurs in adding machines; that is to say, the type bar is then arrested in printing position by the transfer tooth of the wheel being arrested by the back side of the transfer dog, and any lost motion at that point results in inaccurate adjustment of the type to printing position. The slight movement of the transfer dogs above described tends to cure this trouble also, for, in creating needed lost motion or slack at this point for transferring, the slack on the opposite side of the tooth is taken up, so that in this machine the type bars in total taking are arrested with an excellent degree of accuracy in their appropriate printing positions. It will be recalled that in this machine at the moment of printing the total, the dogs 436 are also set radially inward to a slight extent, as hereinbefore described.

*Algebraic subtraction (credit balance)*

In this machine the addition and subtraction of the fugitive "1," when there is a change of sign of the balance indicated on the register, is accomplished by transfer from the wheel of highest to that of the lowest order. The wheel of highest order controls a transfer dog 436, but, instead of one of the regular links 444, its lever 438 has pivoted thereto a specially constructed link 614 (Fig. 16), which at its lower end is guided by an arm like the lever arms 446 but not furnished with an arm 448 controlling a rack. This special link is drawn downward by a special spring 615. Near its upper end it is cross-shaped having two arms 616 and 617, projecting respectively, forward and back. A bail-shaped piece 618 (Figs. 17 and 20) is pivoted at 620 on a post projecting inwardly from the left-hand frame plate 127, and its outer or right-hand arm as viewed by the operator is in the nature of a lever of the first order having an ear 621 bent out from its forward arm and a ear 622 from its rear arm. These ears are so disposed that when the register is in its forward or addition position the arm 616 of the link 614 stands above the ear 621 but the arm 617 does not reach to the ear 622 (Fig. 16); but, when the register is in its rear or subtract position, the arm 617 stands over the ear 622. The piece 618 is adapted to rock between two positions. As shown in Fig. 16 the ear 622 is depressed and the ear 621 is elevated, indicating that the register contains a negative balance. If, with the parts standing in this position, a number be added on the register greater than the negative balance already standing there, the highest wheel will be moved by transfer from its 9 to its 0 position, tripping the highest dog 436 and allowing the link 614 to be pulled down by its spring 615, whereupon the arm 616 of said link, acting on the ear 621, will rock the device 618 counter-clockwise to the positive position depressing ear 621 and elevating ear 622. If, then, the machine is set for subtraction, bringing the arm 617 over the ear 622, and a number be subtracted greater than the positive balance just produced, this mechanism will be operated as before, but with the opposite result, viz., the device 618 will be swung back to its negative position. After each operation, such as the two just described, the special link 614 and its dog 436 will be restored to normal along with the other transfer mechanisms, but the piece 618 will remain in position until the next change of the sign of the balance. An expansion spring 623 (Fig. 18) connects a stationary stud 624 with a stud 625 in the piece 618, which stud swings from one side of a dead center to the other, so that said spring tends to retain the piece 618 in either of its two positions.

The double rack 113, 114 for the register wheel of lowest order is controlled by a train of transfer devices 436 to 448, exactly the same as the other wheels. Just to the right of this wheel there is journaled on the shaft 340 a device 626 (Figs. 16 and 20) having a single transfer tooth in position to engage the tooth 453 of the transfer dog which controls the lowest wheel. This device is operated by a link 627 connecting it with an arm 628 of a bail 630 pivoted on the shaft 527 of the register. The left-hand end of this bail has a rearwardly extending arm 631, which is pivoted to a link 632, which is pivoted to the bail 618 at 629. When the register frame is shifted front and back between its different positions, the link 632 swings idly about its lower pivot; and when the register wheel of highest order passes from 9 to 0 in changing a negative to a positive balance, the device 618 is swung counter-clockwise, which, through link 632 swings the bail lever 631, 630, 628, and through link 627, swings the toothed device 626 all in the same direction. The tooth of said device acts on the dog tooth 453 and causes "1" to be transferred to the wheel of lowest order. This whole train of mechanism will remain in this position until a number is subtracted which changes the balance to negative, at which time the toothed device 626 will be swung in the opposite direction and cause "1" to be subtracted by transfer from the wheel of lowest order.

This algebraic mechanism does not carry "1" to the wheel of lowest order when the capacity of the register is exceeded in either direction. If, for example, the register indicates a negative balance, the pivoted device 618 will stand in the position shown in Fig. 16, in which the ear 622 is depressed. In a subtracting operation the link 614 will stand in its rear position with its arm 617 over the already depressed ear 622. If now a number be subtracted, giving a total which exceeds the capacity of the register, the highest wheel will trip its transfer dog and the link 614 will move downward, but, as the ear 622 is already down, this motion will be without effect. A similar thing would occur on a positive over-running of the register. Such a positive over-running of the register would cause the highest wheel to register "1" instead of its usual 0, and the mechanism would not shift to a negative balance, until this "1" had first been subtracted out, which, as there are more register wheels in the machine than there are columns of key-set stops 105, can occur only by transfer. The over-running must, therefore, be corrected before the machine can shift to a "negative balance."

It is believed that the mode of operation of the mechanism has been sufficiently explained in the preceding description.

Various changes may be made in the details of construction and arrangement without departing from the invention.

What I claim as new, and desire to secure by Letters Patent, is:

1. In a computing machine, the combination of register wheels turned one way for addition and the other way for subtraction and having transfer teeth, and cooperating transfer mechanism including a transfer dog spring-urged in the direction of the radius of a wheel and having a lug, a fixed stop against which said lug is held and from which it can be pushed by said transfer tooth in one direction in addition and the other way in subtraction, and means settable in addition to prevent displacement of said dog in said other way and in subtraction to prevent displacement thereof in the first recited way, said means acting when the machine is set for addition to move said dog slightly beyond its center position in the first recited way and when the machine is set for subtraction to move said dog slightly beyond its center position in said other way.

2. In a computing machine, the combination of register wheels having transfer teeth, actuating racks and type bars connected therewith, and cooperating transfer mechanism including in each of a succession of denominations a transfer dog spring-urged radially of wheel and having a lug, a fixed stop against which said lug is held and from which it can be pushed by said transfer tooth in one direction for addition and in the opposite direction for subtraction, two bars acting alternatively to prevent displacement of said dogs one in one direction and the other in the other direction, means for moving one of said bars into and the other out of active position when setting the mechanism for addition and for moving the second mentioned bar into and the first out of active position when setting the mechanism for subtraction, each of said bars when moved to active position moving said dogs slightly beyond a middle position.

3. In a computing machine including register wheels having transfer teeth, cooperating transfer mechanism including in combination a dog displaceable by a transfer tooth in opposite directions, viz., in one direction in addition and in the other direction in subtraction, two abutments for said dog settable for addition and for subtraction, one acting to prevent displacement thereof in the second mentioned direction in addition and the other in the first mentioned direction in subtraction, and means for shifting said abutments from one setting to the other, said means acting first to move the inactive abutment toward the dog and afterwards to move the previously active abutment to inactive position.

4. In a computing machine, the combination of register wheels turned one way in addition and the opposite way in subtraction and having transfer teeth, cooperating transfer mechanism including a transfer dog spring-urged radially of a wheel and having a lug, a stop from which said lug can be pushed by said transfer tooth in one direction in addition and in the opposite direction in subtraction, and means for resetting said transfer mechanism after an operation thereof, said means including means for moving said stop radially of the wheel, moving said dog to bring said lug back into engagement with said stop, and then moving said stop and dog back to normal position.

5. In a computing machine including operating mechanism having a forward and a return stroke, the combination of register wheels, dogs that are drawn by springs radially away from said wheels, a device normally holding said dogs against the tension of their springs, whereby a register wheel frees its associated dog from said device, means controlled by said dog when so freed to transfer a unit to another wheel, means acting during the forward stroke of said operating mechanism to withdraw said device and to re-connect it with any operated dogs and then to restore said device and dogs to normal position, and means under control of said operating mechanism for holding said device in normal position during the return stroke of said operating mechanism.

6. In a computing machine including register wheels and actuators therefor and operating mechanism including means for moving said wheels and actuators into and out of mesh, the combination with the recited elements of transfer mechanism including dogs that are drawn by springs radially away from said wheels, a device normally holding said dogs against the tension of their springs, means whereby a register wheel frees its associate dog from said device, means controlled by said dog when so freed to transfer a unit to another wheel, transfer resetting means including means for withdrawing said device and re-connecting it with any operated dogs and then restoring said device and dogs to normal position, and means controlled by said wheel-engaging means for locking said device in normal position when the register wheels and actuators are in mesh.

7. In a computing machine including operating mechanism having a forward and a return stroke, the combination of register wheels and transfer mechanism including dogs that are drawn by springs radially away from said wheels, a device normally holding said dogs against the tension of their springs, means whereby a register wheel frees its associate dog from said device, means controlled by said dog when so freed to transfer a unit to another wheel, a cam reciprocated by and with said operating mechanism and acting during the forward stroke first to withdraw said device to re-connect it with any operated dogs, and then to restore it and said dogs to normal position, said cam being inactive on the return stroke.

8. In a computing machine having mechanism for registering and recording numbers and for taking totals, said mechanism including operating mechanism having a forward and a return stroke, the combination with said mechanism of register wheels, transfer mechanism including dogs that are drawn by springs radially away from said wheels, a device normally holding said dogs against the tension of their springs, means whereby a register wheel frees its associate dog from said device, means controlled by said dog when so freed to transfer a unit to another wheel, a cam reciprocated by and with said operating mechanism and acting during the forward stroke first to withdraw said device to reconnect it with any operated dogs and then to restore it and said dogs to normal position, said cam being inactive on the return stroke; and means for rendering said cam inactive and for holding said device against retraction in total-taking operations.

9. In a computing machine including operating mechanism having a forward and a return stroke, the combination of register wheels, dogs that are drawn by springs radially away from said wheels, a device normally holding said dogs against the tension of their springs, means whereby a register wheel frees its associate dog from said device, means controlled by said dog when so freed to transfer a unit to another wheel, and a cam reciprocated by and with said operating mechanism and acting during the forward stroke first to withdraw said device to reconnect it with any operated dogs and then to restore it and said dogs to normal position, said cam having a part deflectable on the return stroke.

10. In a computing machine having mechanism for registering and recording numbers and for taking totals, said mechanism including operating mechanism having a forward and a return stroke, the combination with said mechanism of register wheels, dogs that are drawn by springs radially away from said wheels, a device normally holding said dogs against the tension of their springs, means whereby a register wheel frees its associate dog from said device, means controlled by said dog when so freed to transfer a unit to another wheel, a cam reciprocated by and with said operating mechanism and acting during the forward stroke first to withdraw said device to reconnect it with any operated dogs and then to restore it and said dogs to normal position, said cam having a part deflectable on the return stroke, and means for deflecting said part on the forward stroke in total-taking operations.

11. In a computing machine having mechanism for registering and recording numbers and for taking totals, said mechanism including operating mechanism having a forward and a return stroke, the combination with said mechanism of register wheels, dogs that are drawn by springs radially away from said wheels, a device normally holding said dogs against the tension of their springs, means whereby a register wheel frees its associate dog from said device, means controlled by said dog when so freed to transfer a unit to another wheel, a cam reciprocated by and with said operating mechanism and acting during the forward stroke first to withdraw said device to re-connect it with any operated dogs and then to restore it and said dogs to normal position, said cam being inactive on the return stroke, a latch acting to hold said device in normal position on the total-taking cycles, and means for releasing said latch.

12. In a computing machine including item and total printing mechanism, register wheels having transfer teeth, and transfer mechanism in which transfer dogs cooperating with said teeth have a motion radially of the register wheels, the improvement which consists in means for moving said transfer dogs radially inward from normal position before printing a total, so as to take up clearance between said dogs and the cooperating transfer teeth.

13. In a computing machine, the combination of register wheels having transfer teeth, cooperating transfer mechanism including a dog spring-urged radially of a wheel, and a lug on the dog, a stationary stop by which said lug is normally held, the construction being such that in addition said transfer tooth moves said dog in one direction to free it from said stop and in subtraction said tooth moves said dog in the opposite direction to free it from said stop for radial movement; and means for setting the machine for addition and for subtraction including in each instance means for slightly shifting the rest position of said dog in the direction in which the dog is moved by said transfer tooth.

14. In a computing machine, the combination of a set of register wheels having transfer teeth, cooperating transfer mechanism including a dog for each wheel spring-urged radially of its wheel and having a lug, a stationary stop by which said lug is normally held, the construction being such that in addition a transfer tooth moves its dog in one direction to free it from said stop for radial movement and in subtraction said tooth moves said dog in the opposite direction from said stop, two transverse bars one on each side of the series of dogs, and means for moving one of said bars into contact with said dogs for addition and the other bar for subtraction, said means acting first to move the inactive bar toward the dogs and then to move the formerly active bar away from said dogs.

15. In a computing machine, the combination of a set of register wheels having transfer teeth, cooperating transfer mechanism including a dog for each wheel spring-urged radially of its wheel and having a lug, a stationary stop by which said lug is normally held, the construction being such that in addition a transfer tooth moves its dog in one direction to free it from said stop for radial movement and in subtraction said tooth moves said dog in the opposite direction from said stop, two transverse bars one on each side of the series of dogs, and means for moving one of said bars into contact with said dogs for addition and the other bar for subtraction, each such bar when moved into contact with the dogs moving a little farther than merely into contact so as to shift said dogs from one initial position to another.

16. In a computing machine, the combination of a set of register wheels having transfer teeth, cooperating transfer mechanism including a dog for each wheel spring-urged radially of its wheel and having a lug, a stationary stop by which said lug is normally held, the construction being such that in addition a transfer tooth moves its dog in one direction to free it from said stop for radial movement and in subtraction said tooth moves said dog in the opposite direction from said stop, two transverse bars one on each side of the series of dogs, means for moving one of said bars into contact with said dogs for addition and the other bar for subtraction, and fixed abutments for limiting the movements of said bars toward said dogs, said abutments being narrower than the dogs, whereby, when a bar is pressed against its abutments it shifts the dogs.

17. In a computing machine, the combination of register wheels and actuators therefor, said wheels shiftable to two positions one for addition and the other for subtraction, a transfer dog controlled by the wheel of highest order and spring-urged radially of the wheel, a lug on the dog, a stationary stop by which said lug is normally held, said dog being moved by said wheel in one direction to free it from said stop for radial movement in addition and in the opposite direction in subtraction, a device having a stationary pivot, means whereby on the radial motion of said dog said device is rocked, said means acting on said device on one side of its pivot in addition and shifting with said register to act on said device on the opposite side of the pivot in subtraction, and means whereby the rocking of said device causes a transfer of a unit to the wheel of lowest order.

WALTER W. LANDSIEDEL.